United States Patent
Kawasoe et al.

(10) Patent No.: US 7,800,320 B2
(45) Date of Patent: Sep. 21, 2010

(54) POWER TRANSMISSION DEVICE, AND DISPLAY DEVICE AND DISPLAY PANEL PEDESTAL THAT HAVE THE POWER TRANSMISSION DEVICE

(75) Inventors: Yoshirou Kawasoe, Osaka (JP); Nobuya Omotezako, Kanagawa (JP); Sunao Tanabe, Kanagawa (JP); Motoi Takemura, Kanagawa (JP)

(73) Assignee: Panasonic Corporation, Osaka (JP)

( * ) Notice: Subject to any disclaimer, the term of this patent is extended or adjusted under 35 U.S.C. 154(b) by 385 days.

(21) Appl. No.: 11/915,620

(22) PCT Filed: May 25, 2006

(86) PCT No.: PCT/JP2006/310420

§ 371 (c)(1),
(2), (4) Date: Nov. 27, 2007

(87) PCT Pub. No.: WO2006/126623

PCT Pub. Date: Nov. 30, 2006

(65) Prior Publication Data

US 2009/0115356 A1    May 7, 2009

(30) Foreign Application Priority Data

May 27, 2005   (JP)   ............... 2005-155244

(51) Int. Cl.
*H02P 1/54*   (2006.01)
*H02P 5/46*   (2006.01)

(52) U.S. Cl. .................... 318/48; 318/68; 318/93; 348/825; 348/292.13; 345/649

(58) Field of Classification Search ............. 318/48, 318/68, 88, 93; 340/691.1; 361/681, 679.27; 348/825, 292.13; 345/649
See application file for complete search history.

(56) References Cited

U.S. PATENT DOCUMENTS 6,570,628 B1 *   5/2003   Hirano .................. 349/11

(Continued)

FOREIGN PATENT DOCUMENTS

CN    2643450    9/2004

(Continued)

*Primary Examiner*—Paul Ip
(74) *Attorney, Agent, or Firm*—Hamre, Schumann, Mueller & Larson, P.C.

(57) ABSTRACT

A power transmission device capable of adjusting a torque to be applied to an output shaft easily and removing a backlash between gears exactly, and a display device and a display panel pedestal that have the power transmission device. A power transmission device 101 includes a display panel 102, an output shaft 103 to which the display panel is connected, output gears 104 and 105 rotating integrally with the output shaft, transmission gears 106 and 107 engaged with the respective output gears, motors 108 and 109 providing driving forces to the respective transmission gears, and a control circuit 110 controlling the motors. The control circuit 110 causes the motors 108 and 109 to rotate the transmission gears 106 and 107 at different rotation numbers, and to transmit different driving forces to the respective output gears 104 and 105. The output shaft 103 receives not only a torque on a rotation direction side, but also a torque on a side opposite to the rotation direction, whereby the occurrence of play due to the direction change of a weight torque of the display panel 102 is suppressed.

12 Claims, 23 Drawing Sheets

U.S. PATENT DOCUMENTS

| | | | |
|---|---|---|---|
| 6,711,003 B2 * | 3/2004 | Nakasuna | 361/679.06 |
| 7,142,418 B2 * | 11/2006 | Numano | 361/679.27 |
| 7,494,100 B2 * | 2/2009 | Tanaka et al. | 248/292.13 |
| 2002/0001049 A1 | 1/2002 | Endo et al. | |
| 2002/0021279 A1 * | 2/2002 | Nakasuna | 345/156 |
| 2003/0233899 A1 | 12/2003 | Ishiyama | |
| 2004/0093447 A1 * | 5/2004 | Numano | 710/72 |
| 2005/0224689 A1 * | 10/2005 | Tanaka et al. | 248/694 |
| 2006/0203013 A1 * | 9/2006 | Chuo | 345/649 |
| 2006/0203135 A1 * | 9/2006 | Myers | 348/825 |
| 2007/0119790 A1 * | 5/2007 | Yoshinaka | 211/4 |
| 2008/0036924 A9 * | 2/2008 | Lester et al. | 348/825 |
| 2008/0068848 A1 * | 3/2008 | Kim | 362/458 |
| 2008/0136610 A1 * | 6/2008 | Limin et al. | 340/425.5 |
| 2008/0170358 A1 * | 7/2008 | Ikunami | 361/681 |
| 2009/0251328 A1 * | 10/2009 | Ikunami | 340/691.1 |

FOREIGN PATENT DOCUMENTS

| | | |
|---|---|---|
| GB | 1 212 581 | 11/1970 |
| JP | 61-197847 | 9/1986 |
| JP | 61-274141 | 12/1986 |
| JP | 4-5142 | 1/1992 |
| JP | 8-326878 | 12/1996 |
| JP | 2002104089 A * | 4/2002 |
| JP | 2002-200941 | 7/2002 |
| JP | 2003-343704 | 12/2003 |
| WO | 03/093062 | 11/2003 |

* cited by examiner

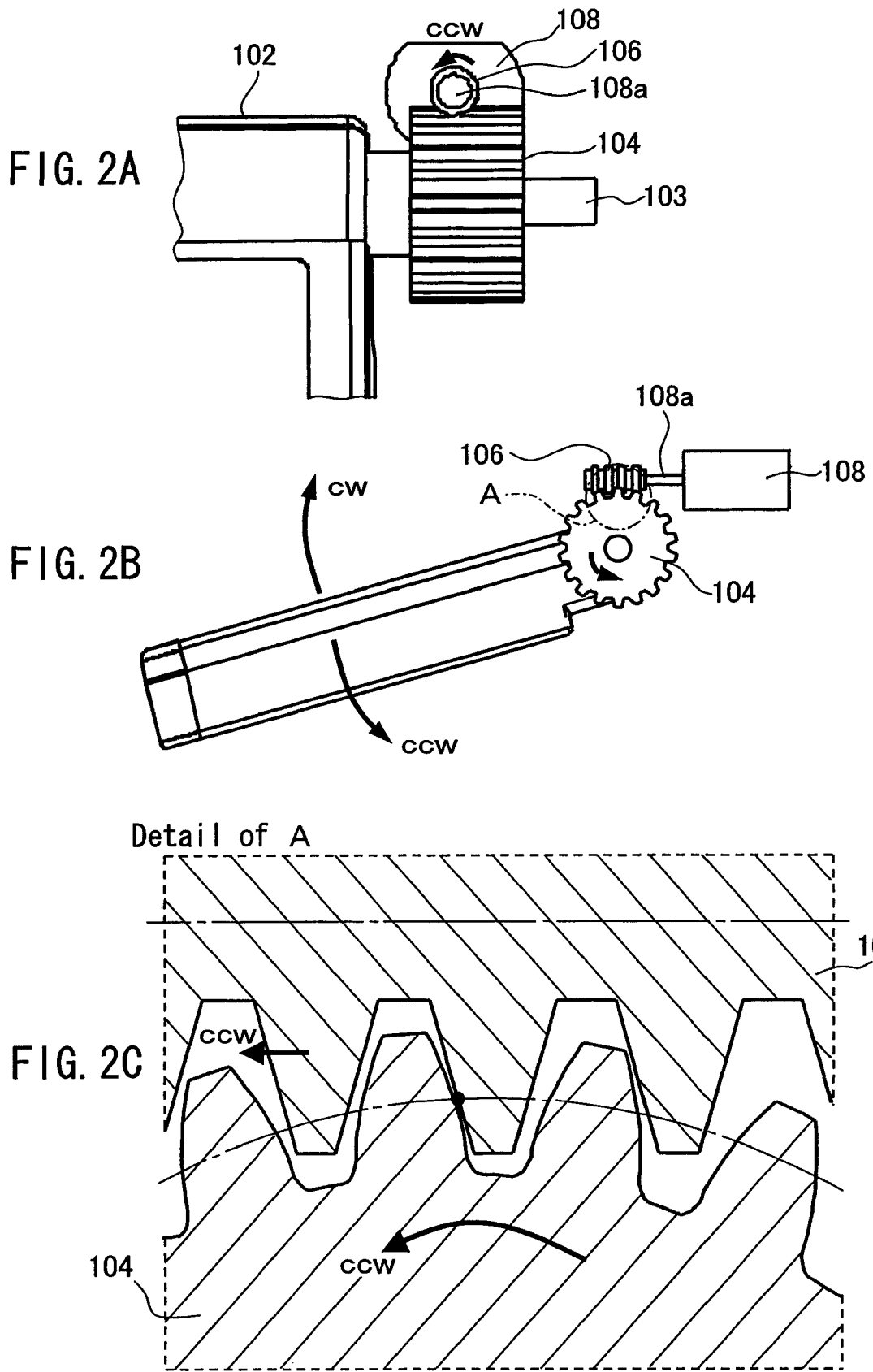

Detail of B

Detail of C

| Circuit condition | State of rotary switch 906 | State of rotary switch 907 | Driving voltage of motor 108 [V] | Driving voltage of motor 109 [V] |
|---|---|---|---|---|
| I | 906a | 907a | 8.0 | 8.0 |
| II | 906b | 907a | 7.5 | 8.0 |
| III | 906b | 907b | 8.0 | 8.0 |

POWER TRANSMISSION DEVICE, AND DISPLAY DEVICE AND DISPLAY PANEL PEDESTAL THAT HAVE THE POWER TRANSMISSION DEVICE

TECHNICAL FIELD

The present invention relates to a power transmission device in which an object with a weight is attached to an output shaft, and in particular, to a power transmission device capable of preventing play (looseness) from occurring in the output shaft due to a backlash, and a display device and a display panel pedestal that have the power transmission device.

BACKGROUND ART

Hereinafter, using FIGS. 19-22, an example of a conventional power transmission device in which an object with a weight is attached to an output shaft will be described. FIG. 19 is a perspective view showing an example of the conventional power transmission device. In the example shown in FIG. 19, a power transmission device 1501 transmits power to a vehicle-mounted display panel (liquid crystal display panel) 102 set on a ceiling surface in an automobile (not shown) (or example, see Patent Document 1).

As shown in FIG. 19, the power transmission device 1501 mainly is composed of a display panel 102, an output shaft 103 to which the display panel 102 is attached, a motor 108 for rotating the output shaft 103, and a power supply unit 1503 for supplying electric power to the motor 108. The motor 108 and the power supply unit 1503 are connected to each other via a wire 1502.

Furthermore, a transmission gear 106 is attached to an output shaft (not shown) of the motor 108, and an output gear 104 is attached to one end of the output shaft 103 in such a manner that the transmission gears 103 and 106 are engaged with each other. Consequently, the driving force of the motor 108 is transmitted from the transmission gear 106 to the output shaft 103 via the output gear 104. Herein, in the example shown in FIG. 19, the transmission gear 106 is a worm gear, and the output gear 104 is a helical gear (worm wheel). Therefore, when the output gear 104 is engaged with the transmission gear 106 to rotate, a rotation axis direction is changed by 90° from a motor shaft direction to an output shaft direction.

Hereinafter, the operation of the power transmission device 1501 shown in FIG. 19 further will be described specifically with reference to FIGS. 20-22. FIG. 20 shows an external force applied to a display panel set on a ceiling surface in an automobile. FIG. 20A is a diagram illustrating an external force applied to the display panel and a direction thereof, and FIG. 20B is a graph showing a relationship between the rotation angle of the display panel and the torque applied to the output shaft due to the weight of the display panel. FIG. 21 is a cross-sectional view showing a state in which the output gear and the transmission gear are engaged with each other in the case where the rotation angle of the display panel is less than 90°. FIG. 22 is a cross-sectional view showing a state in which the output gear and the transmission gear are engaged with each other in the case where the rotation angle of the display panel exceeds 90°.

In FIGS. 20A and 20B, the rotation angle of the display panel 102 in the case where the display panel 102 is accommodated on a ceiling surface is defined as 0°. Furthermore, the rotation angle of the display panel in the case where the display panel 102 descends from the ceiling surface while rotating around the output shaft 103 is defined as a "display panel rotation angle $\theta$". Typically, the stop position of the display panel 102 is set at a place where the display panel rotation angle $\theta$ is about 90°.

Furthermore, in FIG. 20B, a torque T1[N·m] applied to the output shaft 103 due to the weight of the display panel 102 is taken on a vertical axis, and the display panel rotation angle $\theta$ is taken on a horizontal axis. In FIGS. 20A and 20B, a "CW (clockwise) direction" indicates a clockwise direction (direction in which the display panel 102 shifts from an open state to an accommodated state) when the display panel 102 is seen from the right side of a viewer who watches the display panel 102. A "CCW (counterclockwise) direction" indicates a counterclockwise direction (direction in which the display panel 102 shifts from the accommodated state to the open state) when the display panel 102 is seen from the right side of a viewer who watches the display panel 102.

First, the case where the display panel 102 is rotated around the output shaft 103 by the motor 108, and the display panel rotation angle $\theta$ changes from 0° to 90° will be studied. In this study, as shown in FIG. 20A, the output shaft 103 is supplied with the torque T1 in the CCW direction due to the weight of the display panel 102.

Herein, when a mass of the display panel is defined as M, a gravitational acceleration is defined as g, and a distance from the output shaft 103 to the center of gravity of the display panel is defined as r, the torque T1 applied to the output shaft 103 due to the weight of the display panel 102 is represented by the following Expression (1). Furthermore, as shown in the following Expression (1) and FIG. 20B, the torque T1 becomes maximum when the display panel rotation angle $\theta$ is 0°, and becomes 0 when the display panel rotation angle $\theta$ is 90°.

$$T1 = rMg \cos \theta \qquad \text{(Expression 1)}$$

Furthermore, as shown in FIG. 21, in the case where the display panel rotation angle $\theta$ changes from 0° to 90°, in order to rotate the output gear 104 and the output shaft 103 in the CCW direction, the transmission gear 106 rotates so that its tooth surfaces move in the CCW direction.

It should be noted that, in this case, the motor 108 functions as a brake suppressing the display panel 102 from rotating immediately in the CCW direction due to the torque T1 caused by the weight. Thus, in this case, as shown in FIG. 21, the tooth surfaces of the output gear 104 on a rotation direction front side and the tooth surfaces of the transmission gear 106 on a rotation direction back side come into contact with each other.

Next, the case where the display panel 102 rotates further, and the display panel rotation angle $\theta$ exceeds 90° will be studied. In this case, as shown in FIG. 20B, the direction of the torque T1 caused by the weight changes from the CCW direction to an opposite direction thereof (i.e., the CW direction) at a time when the display panel rotation angle $\theta$ reaches 90°. A point at which the torque direction is changed from the previous direction to an opposite direction thereof is referred to as a "torque change point".

On the other hand, the rotation direction of the transmission gear 106 does not change, so that the torque T1 functions as a brake with respect to the display panel 102 that rotates in the CCW direction when the display panel rotation angle $\theta$ exceeds 90°. Thus, in this case, the display panel 102 rotates in the CCW direction only with the driving force of the motor 108 via the transmission gear 106, and as shown in FIG. 22, the tooth surfaces of the output gear 104 on the rotation direction back side and the tooth surfaces of the transmission gear 106 on the rotation direction front side come into contact with each other.

As described above, in the power transmission device 1501, when the direction of the torque T1 is switched, the tooth surfaces that come into contact with each other are switched between the output gear 104 and the transmission gear 106. Then, during a period from a time when the switching of tooth surfaces starts to a time when the switching of tooth surfaces ends, the tooth surfaces of the output gear 104 do not come into contact with the tooth surfaces of the transmission gear 106 due to a backlash. Consequently, play occurs in the output gear 104, and the smoothness is lost from the rotation movement of the display panel 102.

Therefore, conventionally, a power transmission device (hereinafter, referred to as a "backlash-less power transmission device") has been proposed, in which the occurrence of play is suppressed by removing a backlash apparently for example, see Patent Documents 2 and 3).

In the conventional backlash-less power transmission device disclosed by Patent Document 2, an output gear attached to an output shaft is driven with a plurality of transmission gears, and at that time, the rotation speed of each gear for driving is varied. In the backlash-less power transmission device in Patent Document 2, tooth surfaces come into contact at all times, so that the occurrence of play due to a backlash in the output gear can be prevented.

Furthermore, even in a conventional backlash-less power transmission device disclosed by Patent Document 3, a backlash is removed by the same principle as that in the example of Patent Document 2. According to the example of Patent Document 3, a motor is provided for each transmission gear in the backlash-less power transmission device.

Hereinafter, using FIGS. 23 and 24, the backlash-less power transmission device disclosed by Patent Document 3 will be described. FIG. 23 is a perspective view showing an example of a conventional backlash-less power transmission device. FIG. 24 is a cross-sectional view showing a state in which an output gear and a transmission gear are engaged with each other in the backlash-less power transmission device shown in FIG. 23, and FIGS. 24A and 24B respectively show engagement states between different gears.

As shown in FIG. 23, in the same way as in the power transmission device 1501 shown in FIG. 19, a backlash-less power transmission device 1801 includes an output shaft 103 and a motor 108 that rotates the output shaft 103. Furthermore, a transmission gear 106 is attached to an output shaft (not shown) of the motor 108, and an output gear 104 is attached to one end of the output shaft 103. When the transmission gear 106 and the output gear 104 are engaged with each other, the driving force of the motor 108 is transmitted to the output shaft 103.

As described above, although the backlash-less power transmission device 1801 has the same configuration as that of the power transmission device 1501 shown in FIG. 19, it further includes a motor 109 as a power source. The motor 109 has the same characteristics as those of the motor 108, and a transmission gear 107 is attached to a tip end of an output shaft (not shown) of the motor 109. Furthermore, an output gear 105 newly is attached to the other end of the output shaft 103 separately from the output gear 104.

The output gear 105 is fixed at the output shaft 103 in the same way as in the output gear 104, and rotates together with the output gear 104 integrally with the output shaft 103. Furthermore, the output gear 105 is set so that its tooth surfaces and the tooth surfaces of the output gear 104 rotate in the same phase, i.e., the tooth surfaces of the output gear 105 and the tooth surfaces of the output gear 104 are aligned in the shaft direction of the output shaft 103.

Furthermore, the transmission gear 107 of the motor 109 is a worm gear in the same way as in the transmission gear 106 of the motor 108, and the output gear 105 is a helical gear (worm gear) in the same way as in the output gear 104. Furthermore, the output gear 105 and the transmission gear 107 are engaged with each other in the same way as in the output gear 104 and the transmission gear 106. Thus, when electric power is supplied to the motors 108 and 109 by a power supply unit 1804, the output shaft 103 is driven by both the motors 108 and 109.

In the backlash-less power transmission device 1801, a speed reducer 1802 is set between the output shaft of the motor 108 and the transmission gear 106. Furthermore, a speed reducer 1803 having a speed reducing ratio different from that of the speed reducer 1802 is set between the output shaft of the motor 109 and the transmission gear 107. Thus, when the motors 108 and 109 are rotated at the same rotation speed in the same direction, the output shaft 103 is driven while the rotation speed of the transmission gear 106 is different from that of the transmission gear 107.

Herein, the case where the output shaft 103 rotates in the CCW direction, and the rotation speed of the transmission gear 107 is set to be higher than the rotation speed of the transmission gear 106, will be studied. In this case, as shown in FIGS. 24A and 24B, since the output shaft 103 rotates in the CCW direction, the output gears 104 and 105 also rotate in the CCW direction shown in FIGS. 24A and 24B. Furthermore, the transmission gears 106 and 107 that are worm gears rotate around a shaft perpendicular to the output shaft 103 so that the tooth surfaces move in the CCW direction, and rotate the output gears 104 and 105 in the CCW direction.

As shown in FIG. 24A, the rotation speed of the transmission gear 107 is higher than that of the transmission gear 106, and the movement speed in the CCW direction of the tooth surfaces of the transmission gear 107 becomes higher than that of the transmission gear 106. Therefore, the tooth surfaces of the output gear 105 on the rotation direction back side come into contact with the tooth surfaces of the transmission gear 107 on the rotation direction front side. On the other hand, as shown in FIG. 24B, the rotation speed of the transmission gear 107 is lower than that of the transmission gear 107, so that the tooth surfaces of the transmission gear 106 on the rotation direction back side come into contact with the tooth surfaces of the output gear 104 on the rotation direction front side.

Thus, as is understood from FIGS. 24A and 24B, in the case where the output shaft 103 rotates in the CCW direction, the output shaft 103 is supplied with not only a load torque for rotating the output shaft 103 in the CCW direction but also a load torque for rotating the output shaft 103 in the CW direction opposite to the CCW direction. That is, the output shaft 103 rotates in one direction at all times, and simultaneously is braked in the opposite direction. The "load torque" as used herein refers to a torque that is provided to the output gear of the output shaft by the transmission gear of the motor.

Consequently, the contact of tooth surfaces between the transmission gear and the output gear is not interrupted, and a backlash is removed apparently wherever the output gear is placed, whereby the occurrence of play in the output gear due to the backlash is prevented.

Patent Document 1: JP 2002-200941 A

Patent Document 2: JP 2003-343704 A

Patent Document 3: JP 61(1986)-197847 A

DISCLOSURE OF INVENTION

Problem to be Solved by the Invention

As described above, in the backlash-less power transmission device 1801 shown in FIG. 23, a backlash is removed by adjusting the direction and magnitude of a load torque to be applied to the output shaft 103. Furthermore, the adjustment of a load torque is performed only by setting the speed reducing ratio of each speed reducer set in each motor. The motors 108 and 109 that are driving devices have the same characteristics, and are driven at the same rotation speed in the same direction.

However, even motors produced under the same specifications have a variation in characteristics, so that a torque occurring in the motor 108 may be different from that occurring in the motor 109. In this case, a load torque applied to the output shaft 103 is not as designed, so that the contact of tooth surfaces may be interrupted between the transmission gear and the output gear, and a backlash may not be removed.

Furthermore, although a load torque is set in accordance with the mass of a rotation object to be attached to the output shaft 103, there is a variation in mass of rotation objects. For this reason, a load torque to be applied to the output shaft 103 may not be as designed, and a backlash may not be removed.

Furthermore, in the backlash-less power transmission device 1801, it is difficult to adjust the speed reducing ratio of each speed reducer in accordance with the above variation so that a load torque as described is applied to the output shaft 103.

The object of the present invention is to solve the above problems, and to provide a power transmission device capable of adjusting a torque to be applied to an output shaft easily, and removing a backlash between gears exactly, and a display device and a display panel pedestal that have the power transmission device.

Means for Solving Problem

In order to solve the above conventional problems, a display device of the present invention includes a display panel, an output shaft connected to the display panel, two electric motors providing driving forces to the output shaft, and a control circuit controlling the two electric motors, wherein the display panel is connected to the output shaft to rotate together with the output shaft, and the control circuit controls the two electric motors so that the two electric motors provide the driving forces in the same direction to the output shaft and a difference is present between the respective driving forces of the two electric motors.

In the above-mentioned display device of the present invention, the output shaft may be connected to the display panel along one side of a display screen of the display panel so that both ends of the output shaft protrude from the display panel, and may include output gears connected to the respective ends, wherein the respective two electric motors have transmission gears that correspond to the output gears different from each other and that are engaged with the corresponding output gears, and further drive the corresponding output gears via the transmission gears. According to this aspect, a mechanism for rotating the display panel can be made compact, which can minimize the entire device.

Furthermore, it is preferred that the above-mentioned display device of the present invention further includes a resisting gear that is provided for each of the output gears and that is engaged therewith, and a resisting torque generating device that generates a resisting torque resisting a rotation torque that rotates the resisting gear. In this aspect, it is preferred that the resisting torque generating device includes an elastic body for each of the resisting gears, and the elastic body is deformed elastically due to a rotation of the corresponding resisting gear, and an elastic force generated due to the elastic deformation generates the resisting torque.

The above aspect is useful, for example, in the case where the display device of the present invention is attached to a ceiling surface, and the display panel is allowed to protrude from the ceiling. Generally, in this case, the output shaft is supplied with a torque caused by the weight of the display panel. Furthermore, the direction of a torque is switched to a direction opposite to the previous one at a position where the display panel descends most. According to the above aspect, the position where the direction of a torque is switched can be changed, and the direction of a torque can be switched at a position where a user does not pay attention to the display panel. Therefore, even if play occurs due to a backlash, the backlash can be made inconspicuous.

Furthermore, it also is preferred that the above-mentioned display device of the present invention further includes a rotation angle detecting device detecting a rotation angle of the output shaft from a reference position, wherein the control circuit controls the two electric motors so that a difference is present between the driving forces of the two electric motors, when the rotation angle detected by the rotation angle detecting device reaches a set value or more or the rotation angle detected by the rotation angle detecting device exceeds the set value.

Herein, the case where the output shaft is placed so as to receive a torque caused by the weight of the display panel will be considered. In this case, there is a position where a direction of the torque becomes opposite when the output shaft is rotated from the reference position. From this fact, according to the above aspect, it further is preferred that the set value is set to be a value smaller than the rotation angle when a position of the output shaft is matched with the position where the direction of the torque becomes opposite. Consequently, a difference is not provided between the driving forces of the two electric motors until a time immediately before the direction of a torque caused by the weight of the display panel is switched, and the difference is provided immediately before the switching. Thus, play caused by a backlash can be suppressed while the burden on the electric motors is reduced.

Furthermore, in order to solve the above conventional problems, a power transmission device of the present invention includes an output shaft, two electric motors providing driving forces to the output shaft, and a control circuit controlling the two electric motors, wherein the control circuit controls the two electric motors so that the two electric motors provide the driving forces in the same direction to the output shaft, and a difference is present between the respective driving forces of the two electric motors.

In the above-mentioned power transmission device of the present invention, the output shaft may include two output gears connected to the output shaft, and the respective two electric motors may have transmission gears that correspond to output gears different from each other and that are engaged with the corresponding output gears, and further may drive the corresponding output gears via the transmission gears. According to this aspect, a mechanism for transmitting power can be made compact.

Furthermore, it is preferred that the above-mentioned power transmission device of the present invention further includes a resisting gear that is provided for each of the output gears and that is engaged therewith, and a resisting torque generating device that generates a resisting torque resisting a rotation torque that rotates the resisting gear. Furthermore, in this aspect, it is preferred that the resisting torque generating device includes an elastic body for each of the resisting gears, and the elastic body is deformed elastically due to a rotation of the corresponding resisting gear, and an elastic force generated due to the elastic deformation generates the resisting torque.

The above aspect is useful in the case where an object is attached to the output shaft, and the output shaft is supplied with a torque caused by the weight of the object. The direction of a torque caused by the weight is switched to a direction opposite to the previous one at a position where the display panel descends most. According to the above aspect, the position where the direction of a torque is switched can be changed Furthermore, it is preferred that the above-mentioned power transmission device of the present invention further includes a rotation angle detecting device detecting a rotation angle of the output shaft, wherein the control circuit controls the two electric motors so that a difference is present between the driving forces of the two electric motors when the rotation angle detected by the rotation angle detecting device reaches a set value or more or the rotation angle detected by the rotation angle detecting device exceeds the set value. According to this aspect, a difference is provided between driving forces of the two electric motors only when the rotation position of the output shaft is at a certain position, so that the burden on the two electric motors can be reduced.

Furthermore, in order to solve the above-mentioned conventional problems, a display panel pedestal of the present invention includes an output shaft, two electric motors providing driving forces to the output shaft, and a control circuit controlling the two electric motors, wherein the output shaft is formed so as to be connected to an external display panel, and the control circuit controls the two electric motors so that the two electric motors provide the driving forces in the same direction to the output shaft, and a difference is present between the respective driving forces of the two electric motors.

Effects of the Invention

As described above, in a power transmission device and a display device according to the present invention, a torque to be applied to an output shaft is adjusted by controlling outputs of two electric motors to provide a driving force difference therebetween. Thus, in the power transmission device and the display device according to the present invention, a torque to be applied to an output shaft can be adjusted easily in accordance with the variation in characteristics of electric motors and the variation in mass of rotation objects to be attached to the output shaft. Furthermore, this removes a backlash between gears exactly.

BRIEF DESCRIPTION OF DRAWINGS

FIG. 2 shows an engagement state between a transmission gear and an output gear in the power transmission device shown in FIG. 1, FIG. 2A is a front view seen from a direction perpendicular to an output shaft of the power transmission device, FIG. 2B is a side view seen from a shaft direction of the output shaft of the power transmission device, and FIG. 2C is a cross-sectional view showing a cross-section of a portion A shown in FIG. 2B.

FIG. 3 shows cross-sectional views of an engagement state between the output gear and the transmission gear in the case where a display panel rotation angle θ is less than 90° in the power transmission device in Embodiment 1 of the present invention.

FIG. 4 shows cross-sectional views of an engagement state between the output gear and the transmission gear in the case where the display panel rotation angle θ exceeds 90° in the power transmission device in Embodiment 1 of the present invention.

FIG. 8 shows a part of the power transmission device shown in FIG. 7 in an enlarged state.

FIG. 9 shows an engagement state among respective gears on one side of the power transmission device shown in FIG. 7.

FIG. 10 shows an engagement state among respective gears on the other side of the power transmission device shown in FIG. 7.

FIG. 11 shows graphs of a relationship among a rotation angle of a display panel in Embodiment 2 of the present invention, a torque applied to an output shaft due to the weight of the display panel, and an elastic force of a torsion coil spring.

FIG. 13 shows perspective views of a part of the power transmission device shown in FIG. 12 in an enlarged state.

FIG. 16 shows a switching operation of the rotary switch by the paddle shown in FIG. 12.

FIG. 17 shows explanatory diagrams of a setting angle α of the paddle shown in FIG. 12.

FIG. 20 shows an external force applied to a display panel set on a ceiling surface in an automobile.

DESCRIPTION OF THE INVENTION

Hereinafter, the best mode for carrying out the present invention will be described with reference to the drawings.

Embodiment 1

Figure 1:
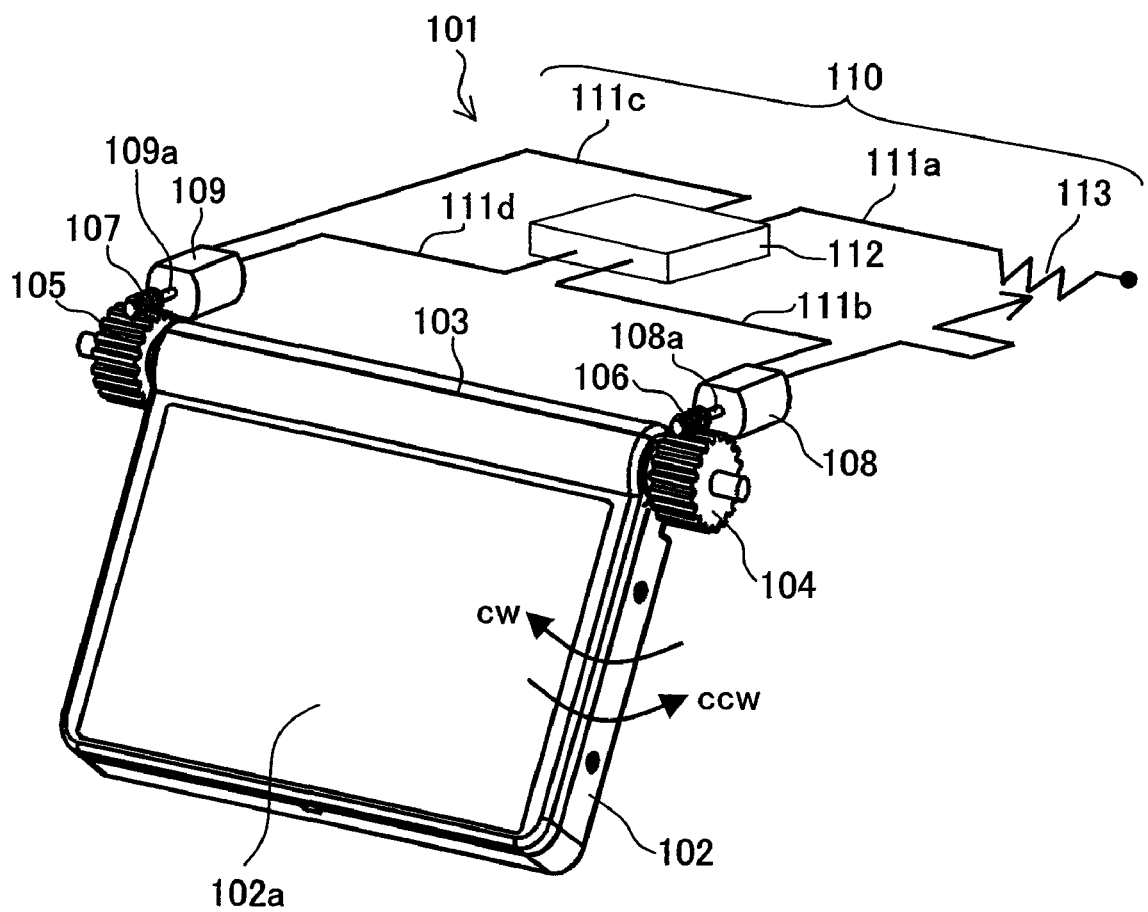
FIG. 1 is a perspective view showing schematic configurations of a power transmission device and a display device in Embodiment 1 of the present invention.

First, configurations of a power transmission device and a display device using the same in Embodiment 1 of the present invention will be described with reference to FIGS. 1 and 2. FIG. 1 is a perspective view showing configurations of the power transmission device and the display device in Embodiment 1 of the present invention. FIG. 2 shows an engagement state between a transmission gear and an output gear in the power transmission device shown in FIG. 1, FIG. 2A is a front view seen from a direction perpendicular to an output shaft of the power transmission device, FIG. 2B is a side view seen from a shaft direction of the output shaft of the power transmission device, and FIG. 2C is a cross-sectional view showing a cross-section of a portion A shown in FIG. 2B.

As shown in FIG. 1, the display device in Embodiment 1 includes a power transmission device 101 in Embodiment 1 and a display device 102. Furthermore, the power transmission device 101 in Embodiment 1 includes an output shaft 103, two electric motors 108 and 109 providing a driving force to the output shaft 103, and a control circuit 110 controlling the motors 108 and 109. The output shaft 103 is connected to the display panel 102.

Figure 19:
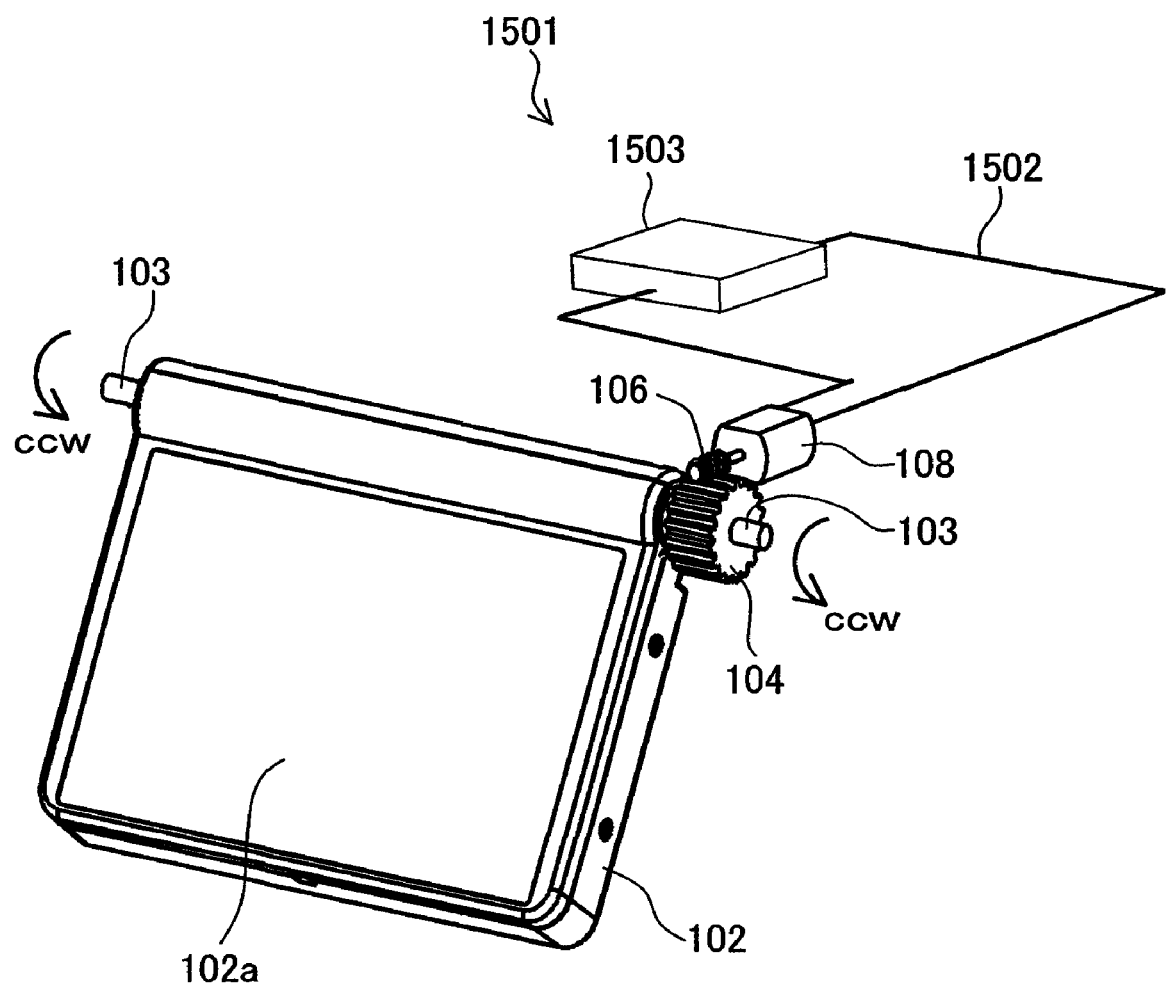
FIG. 19 is a perspective view showing an example of a conventional power transmission device.

In Embodiment 1, the output shaft 103 is connected to the display panel 102 along one side (long side) of a display screen 102a of the display panel 102 so that both ends of the output shaft 103 protrude from the display panel 102. Due to the connection between the display panel 102 and the output shaft 103, in the same way as in the example shown in FIG. 19 in the Background Art, when the output shaft 103 rotates, the display panel 102 rotates like a door. The display panel 102 and the output shaft 103 may be connected by any method. For example, a body portion of the display panel 102 and the output shaft 103 may be formed integrally.

Furthermore, in Embodiment 1, the display panel 102 (display device) also is set on a ceiling surface in an automobile (not shown) in the same way as in the example shown in FIG. 20 in the Background Art. The power transmission device 101 is used for a passenger sitting at a backseat, a seat next to a driver, or the like to expose the display panel 102 accommodated on the ceiling and adjust the display panel 102 at an easy-to-see angle while watching the display panel 102. In the example shown in FIG. 1, a general 9-inch liquid crystal panel is used as the display panel 102.

Furthermore, in Embodiment 1, the angle of the display panel 102 in the case where the display panel 102 is accommodated on a ceiling surface also is defined as 0° in the same way as in the example shown in FIG. 20. Furthermore, the angle of the display panel 102 when the display panel 102 descends from the ceiling surface while rotating around the output shaft 103 is defined as a "display panel rotation angle θ". Furthermore, a "CW (clockwise) direction" is defined as a clockwise direction (direction in which the display panel 102 shifts from an open state to an accommodated state) when the display panel 102 is seen from the right side of a viewer who watches the display panel 102. A "CCW (counterclockwise) direction" indicates a counterclockwise direction (direction in which the display panel 102 shifts from the accommodated state to the open state) when the display panel 102 is seen from the right side of a viewer who watches the display panel 102.

Furthermore, in Embodiment 1, the output shaft 103 includes output gears 104 and 105 respectively fixed to ends protruding from the display panel 102. The motors 108 and 109 correspond to different output gears, respectively, and include transmission gears that are engaged with the corresponding output gears. Specifically, the motor 108 includes a transmission gear 106 that is engaged with the output gear 104, and drives the output gear 104 via the transmission gear 106. Furthermore, the motor 109 includes a transmission gear 107 that is engaged with the output gear 105, and drives the output gear 105 via the transmission gear 107.

Furthermore, as shown in FIGS. 1, 2A, and 2B, the output gear 104 is a helical gear (worm wheel) connected to one end of the output shaft 103. The output gear 105 also is a helical gear (worm wheel) connected to the other end of the output shaft 103. The output gears 104 and 105 are matched with each other in their specifications such as a circular pitch, a module, and a tooth shape. Furthermore, the output gears 104 and 105 are set so that respective tooth surfaces rotate in the same phase at all times, i.e., the tooth surfaces of the output gear 105 and the tooth surface of the output gear 104 are aligned in the shaft direction of the output shaft 103.

Furthermore, the transmission gear 106 and the transmission gear 107 are both worm gears, and are matched with each other in their specifications. Thus, in the same way as in the example shown in FIG. 23 in the Background Art, when the transmission gear 106 and the transmission gear 107 rotate in the same direction, the driving force in the same direction is transmitted to the output gear 104 and the output gear 105.

Herein, the operations of the output gear 104, the transmission gear 106, and the motor 108 will be described with reference to FIGS. 2A-2C. As shown in FIG. 2B, in the case where the display panel 102 is rotated in the CCW direction shown in FIG. 2B, the transmission gear 106 is rotated in the CCW direction shown in FIG. 2A. Then, as shown in FIG. 2C, the tooth surfaces of the transmission gear 106 move in the CCW direction shown in FIG. 2C to press (bias) the tooth surfaces of the output gear 104 on the rotation direction back side to the CCW direction. Consequently, the display panel 102 rotates in the CCW direction as shown in FIG. 2B.

Although not shown in FIGS. 2A-2C, the operations of the output gear 105, the transmission gear 107, and the motor 109 are the same as those described above. The "CCW direction" shown in FIG. 2A indicates the rotation direction of the transmission gear 106 for rotating the display panel 102 in the CCW direction.

Figure 23:
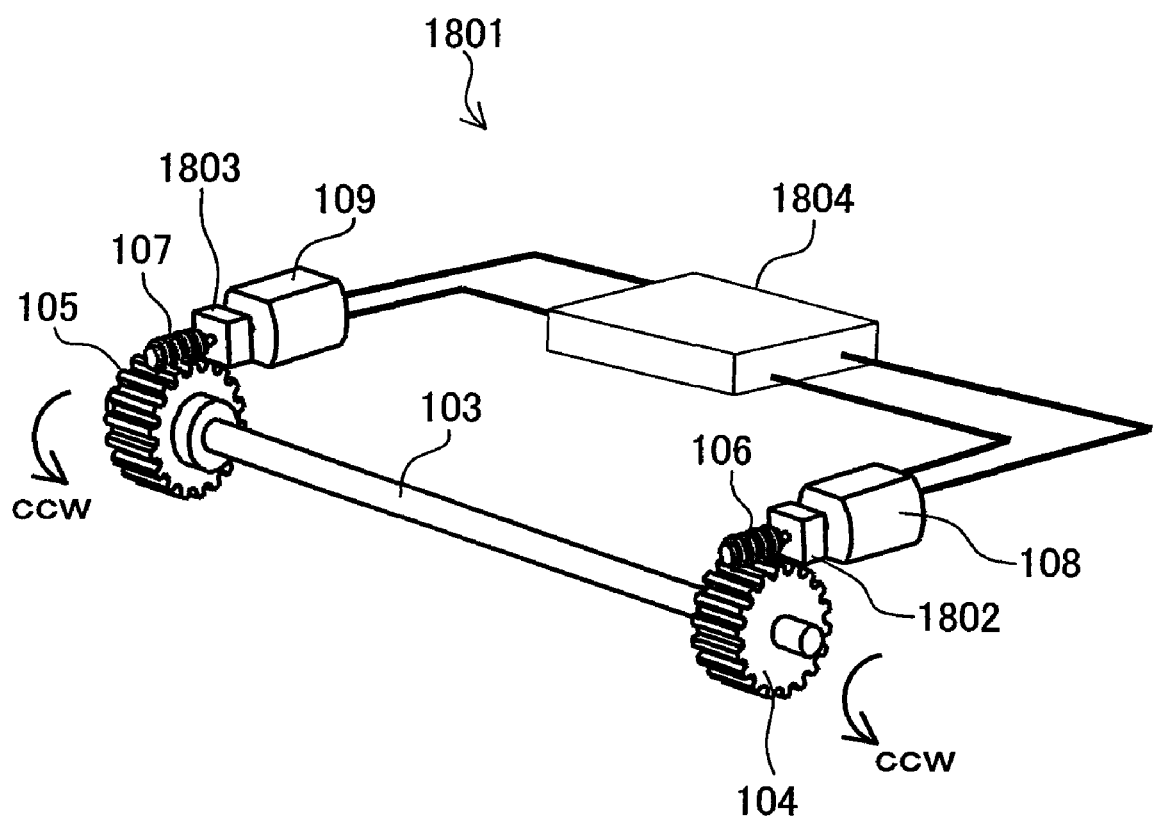
FIG. 23 is a perspective view showing an example of a backlash-less conventional power transmission device.
Figure 24A:
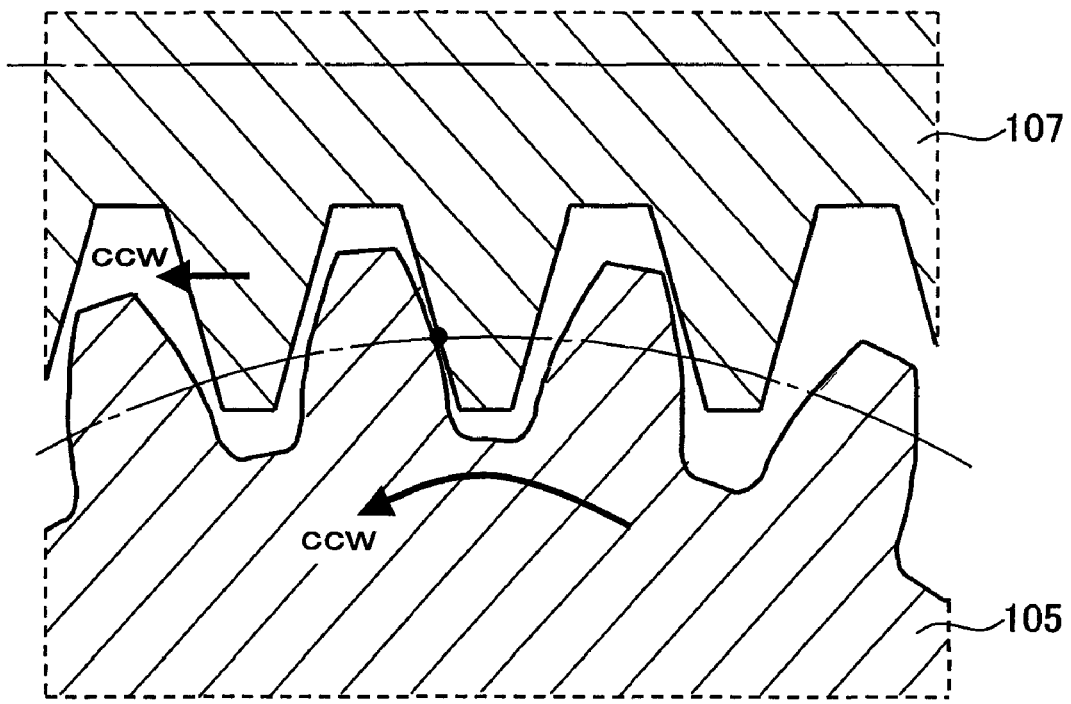
FIG. 24 is a cross-sectional view showing an engagement state between an output gear and a transmission gear in the backlash-less power transmission device shown in FIG. 23, and FIGS. 24A and 24B show respectively engagement states between different gears.
Figure 24B:
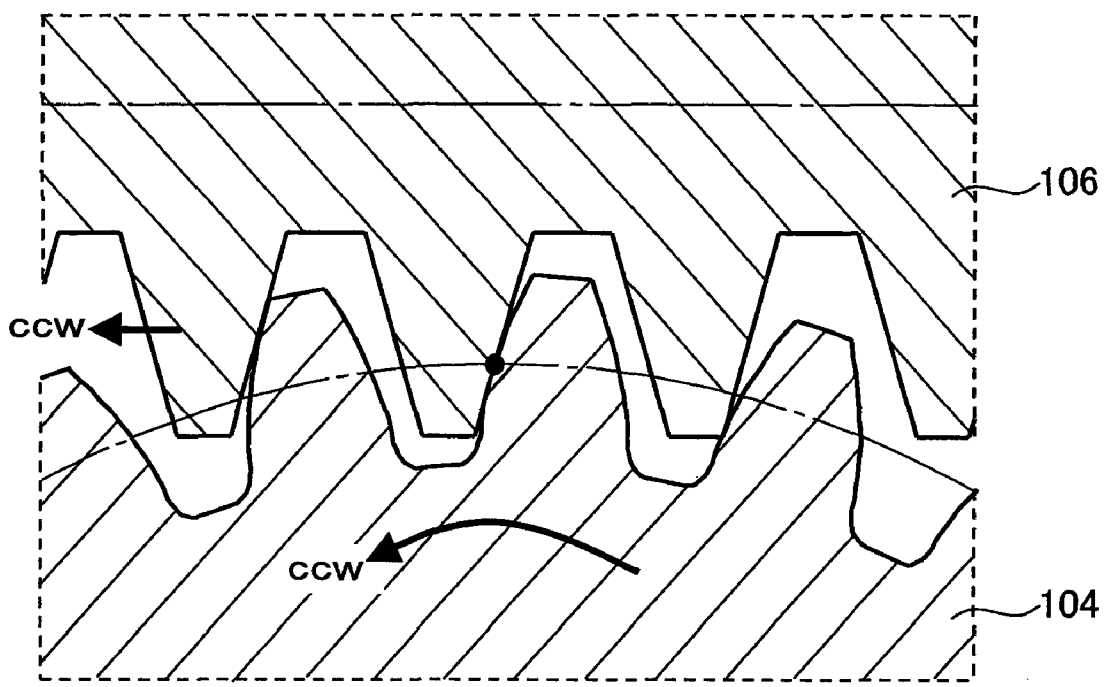

Thus, in the power transmission device in Embodiment 1, two motors 108 and 109 also drive one output shaft 103 in the same way as in the backlash-less power transmission mechanism shown in FIG. 23 in the Background Art. It should be noted that the power transmission device in Embodiment 1 is different from the backlash-less power transmission mechanism shown in FIG. 23 in the Background Art in the following points.

In Embodiment 1, the transmission gear 106 is attached directly to an output shaft 108a of the motor 108, and similarly, the transmission gear 107 also is attached directly to an output shaft 109a of the motor 109. In Embodiment 1, the transmission gear is connected to the motor without using a speed reducer, and transmits the driving force of the motor to the output gear directly.

Furthermore, the motors 108 and 109 are controlled by the control circuit 110 so that a difference occurs between the driving forces of the motors 108 and 109. In Embodiment 1, the motors 108 and 109 are supplied with voltages of different magnitudes in the same direction. That is, the control circuit 110 controls both the motors 108 and 109 by applying voltages to them in such a manner that the motors 108 and 109 provide the output shaft 103 with the driving forces in the same direction, while applying voltages to them in such a manner that a difference occurs between the respective driving forces of the motors 108 and 109. The motors 108 and 109 are DC motors having the same characteristics, and generate the same driving force in the same direction in the case where the directions and magnitudes of voltages applied to them are the same.

Specifically, the control circuit 110 includes a power supply unit 112, and wires 111a-111d. The power supply unit 112 supplies electric power to the motor 108 through the wires 111a and 111b, and supplies electric power to the motor 109 through the wires 111c and 111d. The power supply unit 112 also can change the rotation directions of the motors 108 and 109 by changing the directions of voltages that the power supply unit 112 supplies. Furthermore, when an operation instruction of the display panel 102 is input, the power supply unit 112 supplies electric power to the motors 108 and 109 so that the output shaft 108 rotates in a designated direction, in accordance with the input operation instruction.

A variable resistor 113 is placed on the wire 111a among the wires 111a-111d. Thus, the voltage of the power supply unit 112 is applied to the motor 109 as it is, whereas the voltage dropped by the variable resistor 113 is applied to the motor 108. Therefore, the driving force provided to the output gear 104 by the motor 108 becomes smaller than the driving force provided to the output gear 105 by the motor 109, whereby a difference occurs therebetween. In Embodiment 1, although the motors 108 and 109 are tilt motors having a voltage rating of 12.0 V, the specification and performance of the motors 108 and 109 are not limited in the present invention.

Figure 3A:
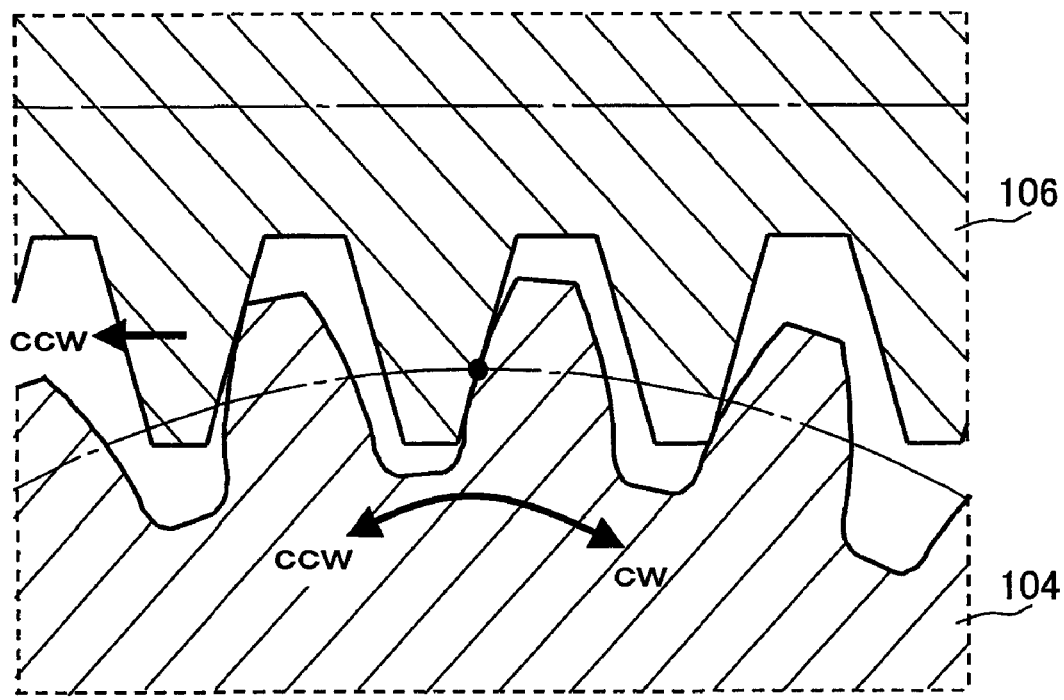
FIG. 3A is a cross-sectional view showing an engagement state between a transmission gear 106 and an output gear 104.
Figure 3B:
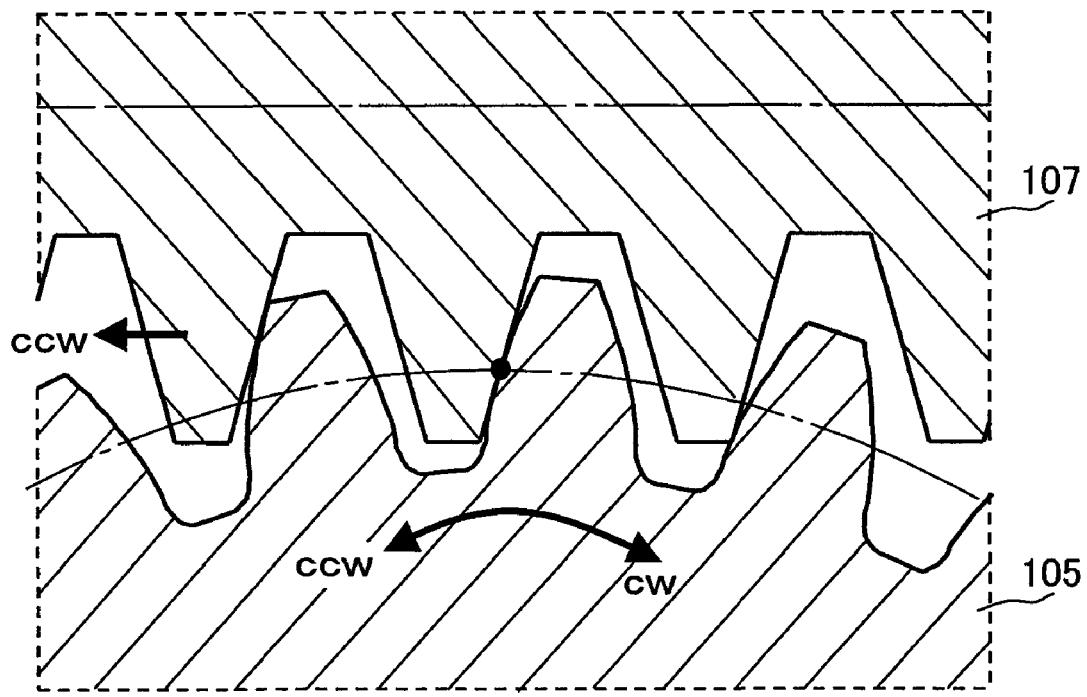
FIG. 3B is a cross-sectional view showing an engagement state between a transmission gear 107 and an output gear 105.
Figure 4A:
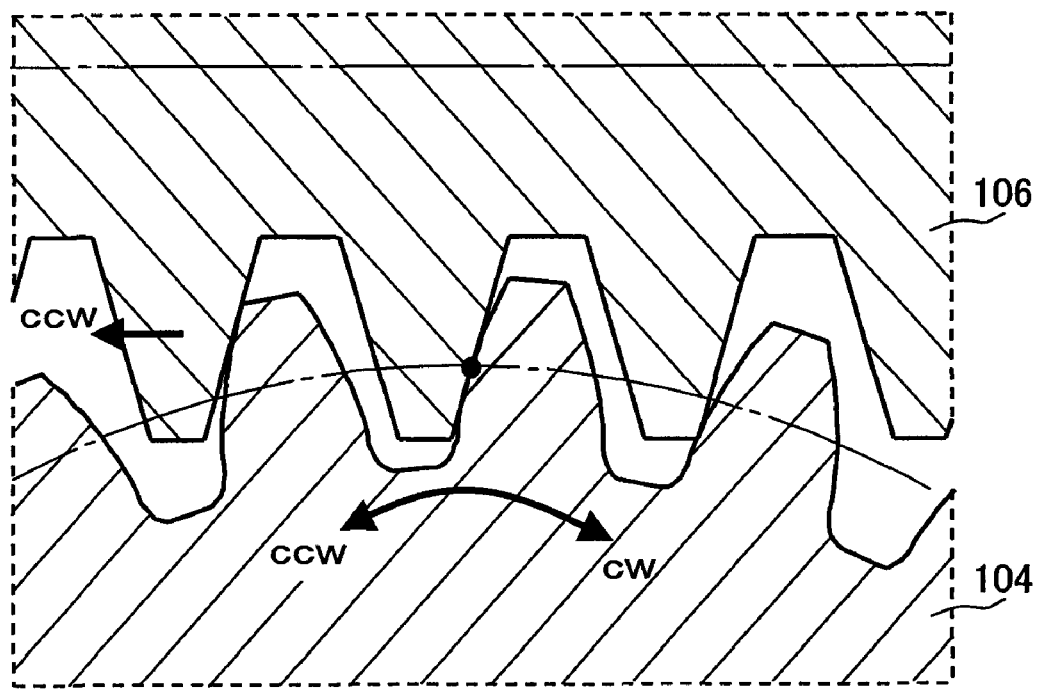
FIG. 4A is a cross-sectional view showing an engagement state between the transmission gear 106 and the output gear 104.
Figure 4B:
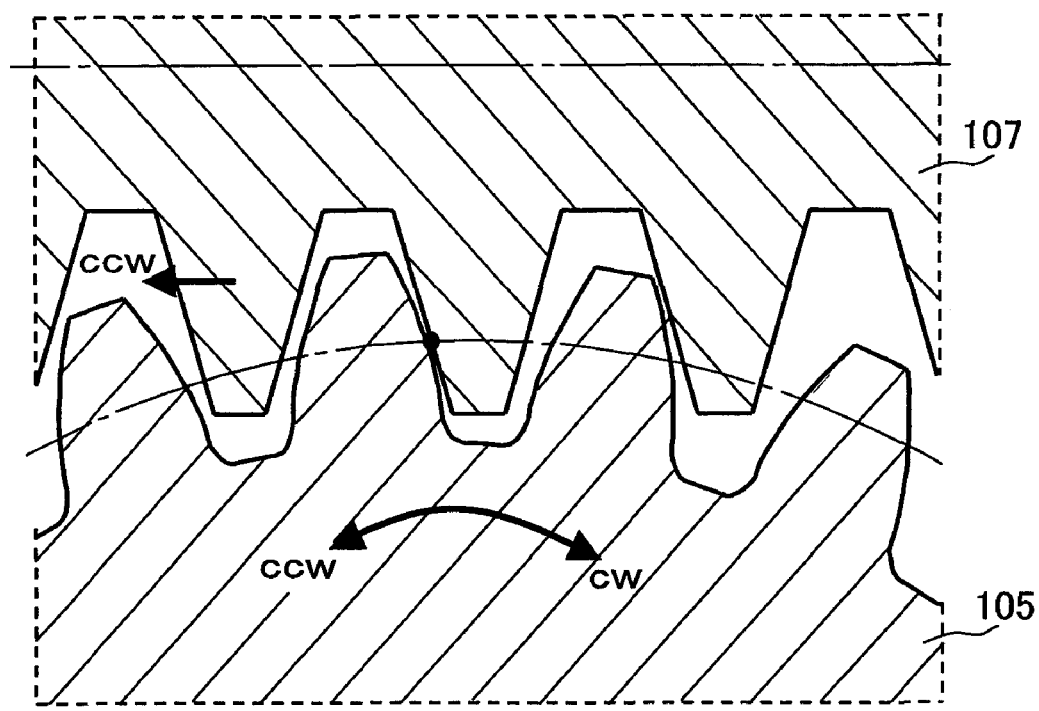
FIG. 4B is a cross-sectional view showing an engagement state between the transmission gear 107 and the output gear 105.

Next, the operation of the power transmission device 101 in Embodiment 1 of the present invention thus configured will be described with reference to FIGS. 3 and 4. FIG. 3 shows cross-sectional views of an engagement state between an output gear and a transmission gear in the case where a display panel rotation angle θ is in the vicinity of 0° in the power transmission device in Embodiment 1 of the present invention, FIG. 3A is a cross-sectional view showing an engagement state between the transmission gear 106 and the output gear 104, and FIG. 3B is a cross-sectional view showing an engagement state between the transmission gear 107 and the output gear 105. FIG. 4 shows cross-sectional views of an engagement state between the output gear and the transmission gear in the case where the display panel rotation angle θ is in the vicinity of 90° in the power transmission device in Embodiment 1 of the present invention, FIG. 4A is a cross-sectional view showing an engagement state between the transmission gear 106 and the output gear 104, and FIG. 4B is a cross-sectional view showing an engagement state between the transmission gear 107 and the output gear 105.

As described above, in Embodiment 1, the motors 108 and 109 are supplied with different driving voltages. For example, in the examples shown in FIGS. 3 and 4, the output voltage of the power supply unit 112 is set to be 8.0 [V], and the motor 109 is supplied with a driving voltage of 8.0 [V]. On the other hand, the voltage drop width of the variable resistor 113 is set to be 0.5 [V], and the motor 108 is supplied with a driving voltage of 7.5 [V].

Figure 20A:
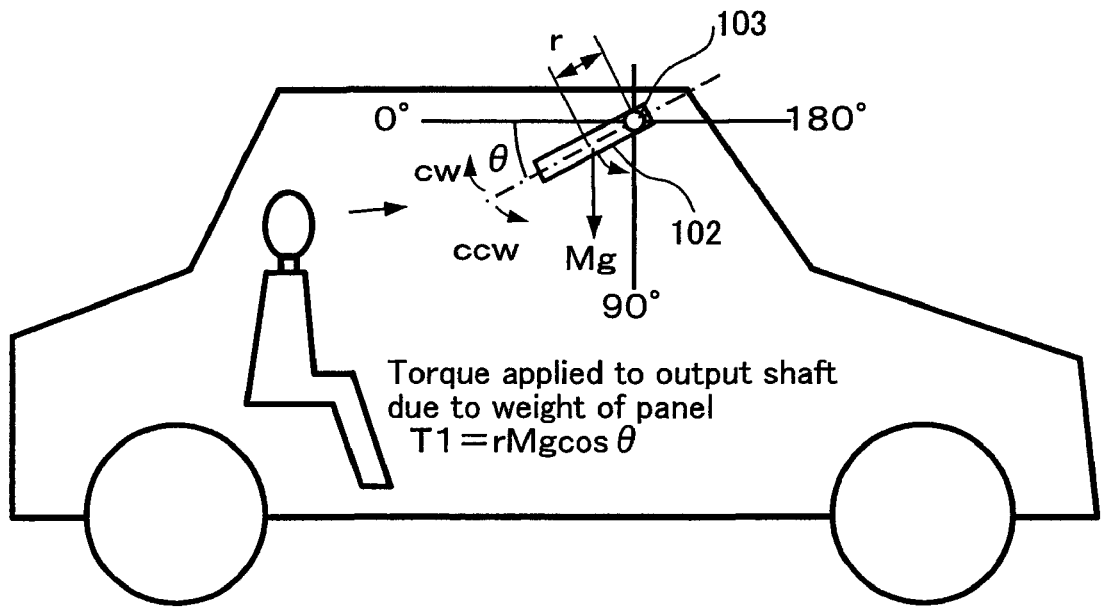
FIG. 20A shows an external force applied to the display panel and a direction thereof.

First, the case where the display panel 102 attached to the ceiling of an automobile is allowed to descend from the accommodated state to the open state will be considered (see FIG. 20A). A passenger (viewer) inputs an instruction to a display device so that the display panel 102 rotates in the CCW direction. Then, the power supply unit 112 supplies voltages to the motors 108 and 109 so that the tooth surfaces of the transmission gears 106 and 107 move in the CCW direction.

Then, the output gear 104 engaged with the transmission gear 106 and the output gear 105 engaged with the transmission gear 107 are driven in the CCW direction, so that the output shaft 103 that rotates integrally with the output gears 104 and 105 also starts rotating in the CCW direction. Furthermore, at this time, the output shaft 103 is supplied with a torque in the CCW direction due to the weight of the display panel 102 (see FIG. 20). Furthermore, at a time when the display panel 102 starts descending in the CCW direction, the torque in the CCW direction due to the weight of the display panel 102 is largest (see FIG. 20B), and is larger than the torque supplied by the driving forces of the motors 108 and 109 in Embodiment 1.

Thus, as shown in FIGS. 3A and 3B, at a time when the display panel 102 starts descending in the CCW direction, the respective tooth surfaces of the output gear 104 and the output gear 105 on a CCW direction front side come into contact with the tooth surfaces of the corresponding transmission gears 106 and 107. That is, at this time, the immediate descent of the display panel 102 due to the weight is prevented by the transmission gears 106 and 107.

Next, the case where the display panel 102 reaches a position designated by a viewer will be considered. When the display panel 102 descends and the display panel rotation angle θ approaches 90°, the torque in the CCW direction due to the weight of the display panel 102 applied to the output shaft 103 approaches zero (see FIG. 20B). Then, the influence of a torque caused by the weight becomes small, so that the motors 108 and 109 attempt to rotate at a rotation number determined by the driving voltage.

As described above, in the examples shown in FIGS. 3 and 4, the motor 108 is driven at 7.5 [V], and the motor 109 is driven at 8.0 [V], so that the transmission gear 107 attempts to rotate faster than the transmission gear 106. Thus, the movement speed of the tooth surfaces of the transmission gear 106 in the CCW direction becomes lower than that of the tooth surfaces of the transmission gear 107. Consequently, as shown in FIG. 4A, the tooth surfaces of the transmission gear 106 on the rotation direction back side come into contact with the tooth surfaces of the output gear 104 on the rotation direction front side, which results in applying a braking torque (torque in the CW direction) to the output shaft 103.

On the other hand, since the transmission gear 107 rotates faster than the transmission gear 106, the movement speed of the tooth surfaces of the transmission gear 107 in the CCW direction becomes higher than that of the tooth surfaces of the transmission gear 106. Thus, as shown in FIG. 4B, the tooth surfaces of the transmission gear 107 on the rotation direction front side come into contact with the tooth surfaces of the output gear 105 on the rotation direction back side, i.e., a torque in the CCW direction is applied to the output shaft 103.

Consequently, the contact of the tooth surfaces is not interrupted between the transmission gear 107 and the output gear 105, and between the transmission gear 106 and the output gear 104, and a backlash can be removed apparently wherever the output gear is placed. Thus, play is prevented from occurring in the output gears 104 and 105, and the smoothness can be suppressed from being impaired in the rotation movement of the display panel 102.

In Embodiment 1, the removal of a backlash is achieved by controlling the difference in driving force between the motors 108 and 109, and adjusting a torque applied to an output shaft. Furthermore, in Embodiment 1, the difference in driving force can be set easily by adjusting the variable resistor 113. Thus, according to Embodiment 1, a torque to be applied to the output shaft 103 can be adjusted easily in accordance with the variation in characteristics between the motors 108 and 109, and the variation in mass of rotation objects (display panel 102) attached to the output axis 103. Therefore, a backlash between gears can be removed completely.

In Embodiment 1, the driving voltage to be applied to the motor 109 is set to be 8.0 [V], and the driving voltage to be applied to the motor 108 is set to be 7.5 [V]. However, Embodiment 1 is not limited thereto. The driving voltage to be applied to each motor may be set so that an average value of driving forces between the motors 108 and 109 becomes such a value as to rotate the output shaft 103, and the output shaft 103 is rotated in one direction due to the difference in both the driving forces, and simultaneously braked in an opposite direction.

For example, in the case where the driving voltage to be applied to one motor is set to be 8.0 [V], and the driving voltage to be applied to the other motor is set to be 4.0 [V], an average value of the driving voltages used for rotating the output shaft 103 becomes 6.0 V. In this case, the average value becomes lower than that (7.75 [V]) in the example shown in FIGS. 1-4. It should be noted that the difference in driving voltage becomes 4 [V], and the driving force that attempts to rotate the output shaft 103 in the CCW direction and the driving force that attempts to rotate the output shaft 103 in the CW direction occur more strongly. Accordingly, in this case, a backlash can be removed more strongly compared with the example described above.

Furthermore, in Embodiment 1, although two output gears 104 and 105 are connected to the output shaft 103, Embodiment 1 is not limited thereto. Embodiment 1 may be configured, for example, as follows: only a single output gear is connected to the output shaft, and the single gear is engaged with two transmission gears. Even in this embodiment, while the output shaft 103 is rotated in one direction, it simultaneously can be braked in an opposite direction, so that a backlash can be removed.

Figure 5:
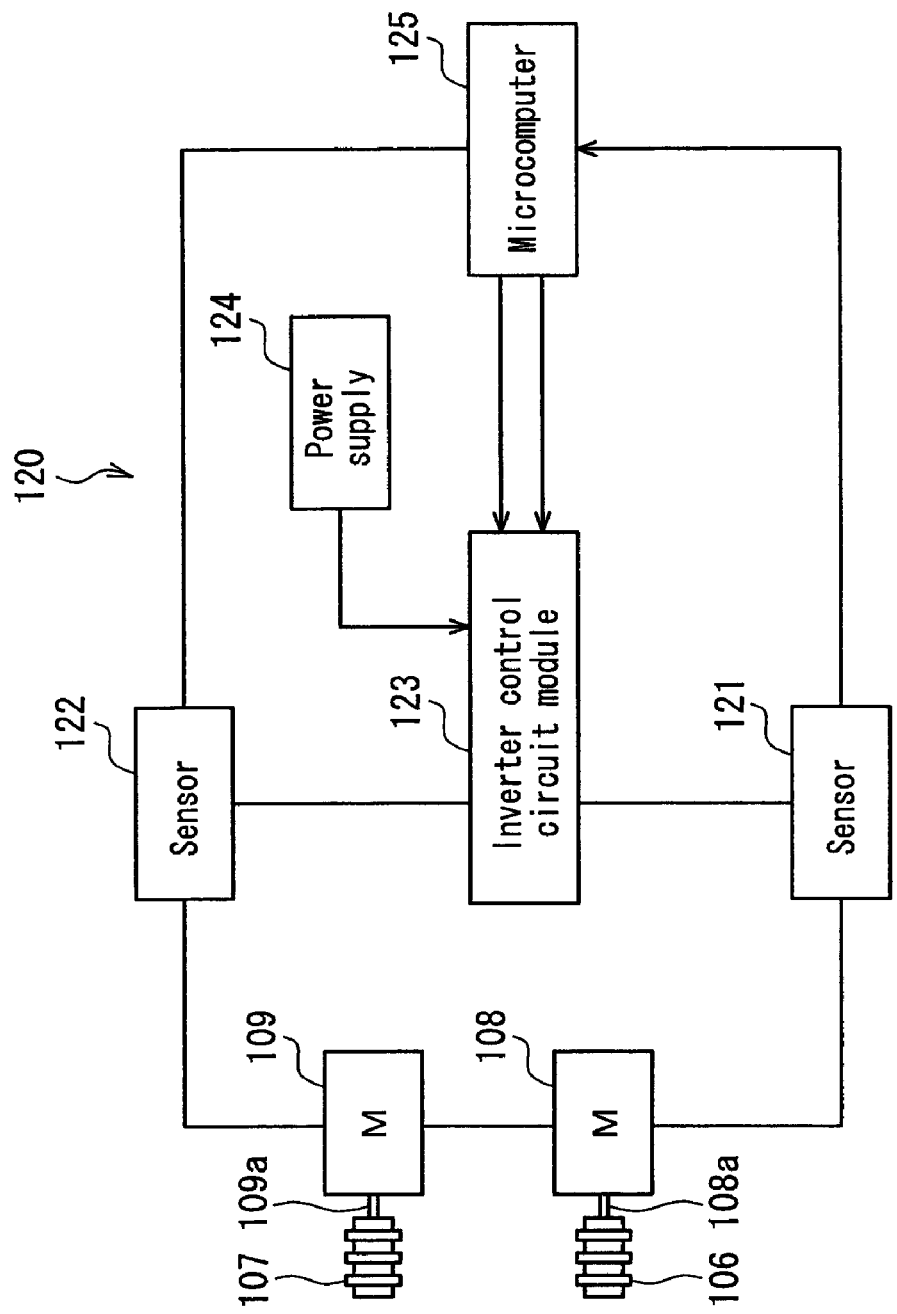
FIG. 5 is a block diagram showing a configuration of a control circuit in the case where a motor is an AC motor.
Figure 6:
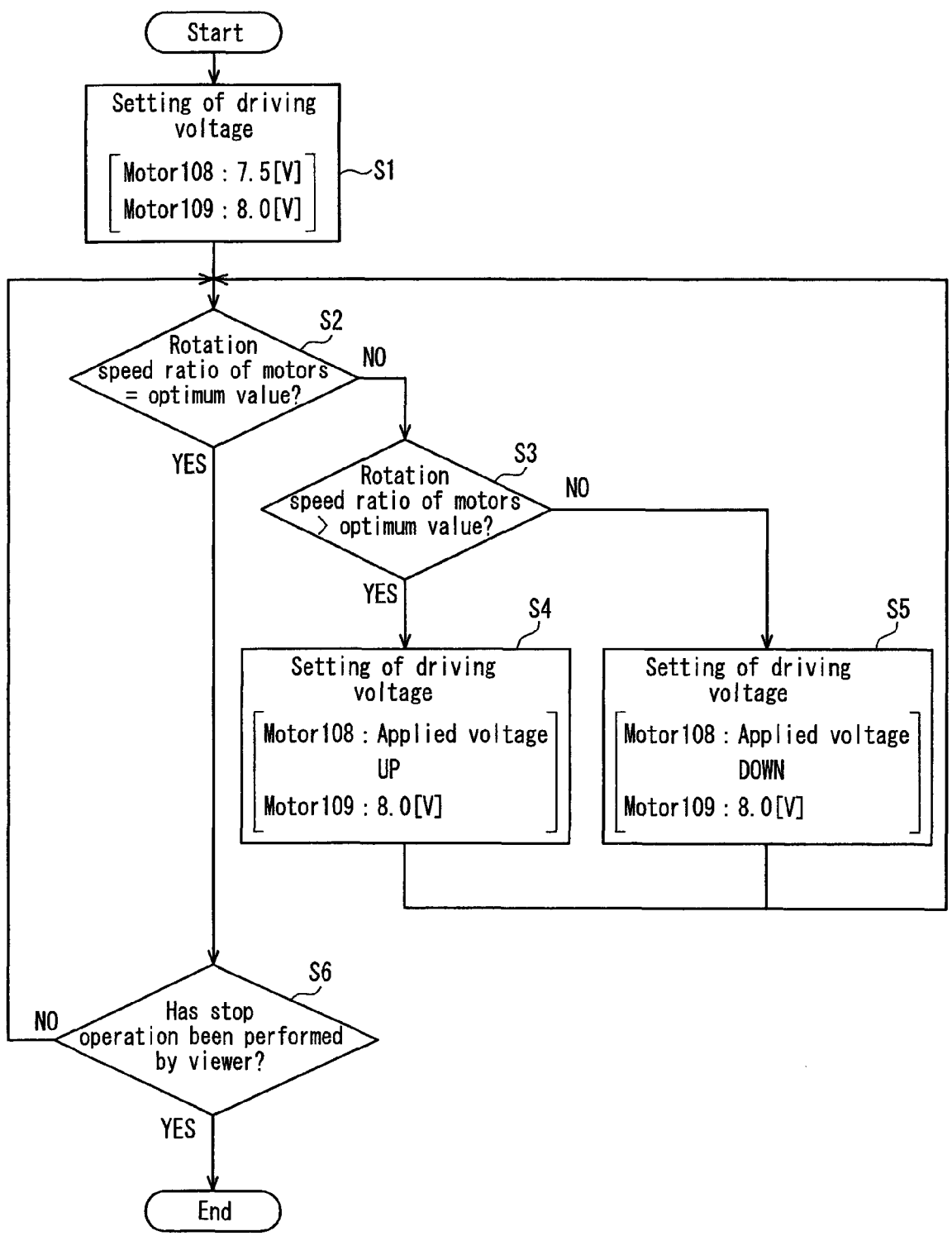
FIG. 6 is a flowchart showing a flow of processing performed by a microcomputer constituting the control circuit shown in FIG. 5.

Furthermore, although the motors 108 and 109 are both DC motors in Embodiment 1, they may not be limited thereto, and AC motors may be used instead. Herein, an example using AC motors will be described with reference to FIGS. 5 and 6. FIG. 5 is a block diagram showing a configuration of a control circuit in the case where the motors are AC motors. FIG. 6 is a flowchart showing a flow of processing performed by a microcomputer constituting the control circuit shown in FIG. 5.

In the example shown in FIG. 5, the motors 108 and 109 are both AC motors with the same specifications. Therefore, as shown in FIG. 5, the control circuit 120 includes sensors 121 and 122, an inverter control circuit module 123, and a microcomputer 125, unlike the control circuit 110 shown in FIG. 1. The inverter control circuit module 123 is supplied with a DC current from an external power supply 124. In the example shown in FIG. 5, the power supply 124 is a battery (12 [V]) mounted on an automobile.

The inverter control circuit module 123 generates a driving pulse for each motor, using the DC current supplied from the power supply 124, and supplies the driving pulse to each motor. Furthermore, the inverter control circuit module 123 sets a pulse width, a voltage level, a pulse interval, and the like of each driving pulse in accordance with the instruction of the microcomputer 125.

Furthermore, the sensors 121 and 122 are current sensors. The sensor 121 sends a signal specifying a current value of a current flowing through the motor 108 to the microcomputer 125. Similarly, the sensor 122 sends a signal specifying a current value of a current flowing through the motor 109 to the microcomputer 125. In the case where the AC motor is driven with an inverter, a pulse width varies depending upon the load applied to the motor and the rotation speed thereof. Consequently, the current value of a current flowing through the motor also varies. Thus, the microcomputer 125 can detect the loads applied to the motors 108 and 109, and the rotation speeds thereof based on the signals from the sensors 121 and 122.

The microcomputer 125 calculates the ratio of a rotation speed of the motor 109 with respect to a rotation speed of the motor 108 (the rotation speed ratio is equal to the rotation speed of the motor 109 divided by the rotation speed of the motor 108), based on the signal from each sensor. The microcomputer 125 adjusts the voltage level of a driving pulse based on the calculated rotation speed ratio so that an appropriate torque is applied to the output shaft 103 (see FIG. 1). Herein, the processing performed by the microcomputer 125 will be described specifically, using FIG. 6.

First, when a viewer (passenger) inputs an operation instruction so as to instruct that the display panel 102 should descend, the microcomputer 125 designates an initial driving voltage to the inverter control circuit module 123 to start the driving of the motors 108 and 109 (Step S1).

In the present example, the driving voltage of the motor 108 is set to be 7.5 [V], and the driving voltage of the motor 109 is set to be 8.0 [V]. The display panel 102 starts descending from the accommodated state due to the execution of Step S1. Then, the motors 108 and 109 are supplied with loads, and the respective rotation speeds vary.

Then, the microcomputer 125 calculates a rotation speed ratio based on the signal from the sensor 121 and the signal from the sensor 122, and determines whether the calculated rotation speed ratio is an optimum value (Step S2). The optimum value is obtained previously by an experiment or the like, and is stored in a memory or the like of the microcomputer 125.

As a result of the determination in Step S2, in the case where the calculated rotation speed ratio is not an optimum value, the microcomputer 125 determines whether or not the rotation speed ratio is larger than the optimum value (Step S3).

As a result of the determination in Step S3, in the case where the rotation speed ratio is larger than the optimum value, the microcomputer 125 sets a driving voltage again, and raises the driving voltage of the motor 108 by a set width (Step S4). Furthermore, as a result of the determination in Step S3, in the case where the rotation speed ratio is smaller than the optimum value, the microcomputer 125 also sets a driving voltage again. However, in this case, the microcomputer 125 drops the driving voltage of the motor 108 by a set width (Step S5). After the completion of Steps S4 and S5, the microcomputer 125 executes Step S2 again after an elapse of a predetermined period of time.

On the other hand, as a result of the determination in Step S2, in the case where the calculated rotation speed ratio is an optimum value, the microcomputer 125 determines whether or not the viewer performs an operation (stop operation) of stopping the rotation of the display panel 102 (Step S6). The microcomputer 125 stops the processing in the case where the stop operation is performed, and otherwise, executes Step S2 again.

Thus, even in the example shown in FIGS. 5 and 6, a difference is provided between the driving force of the motor 108 and the driving force of the motor 109, and a backlash is removed. Furthermore, in the example shown in FIGS. 5 and 6, the driving voltages are adjusted so that a difference in driving force becomes optimum, in accordance with the magnitude of loads applied to the motors 108 and 109. According to the example shown in FIGS. 5 and 6, the reliability of removal of a backlash can be enhanced, compared with the example shown in FIGS. 1-4.

Furthermore, even in the example shown in FIGS. 5 and 6, a difference in driving force can be adjusted easily. Thus, a torque to be applied to the output shaft 103 can be adjusted easily in accordance with the variation in characteristics of the motors 108 and 109, and the variation in mass of a rotation object (display panel 102) to be attached to the output shaft 103.

Embodiment 2

Figure 7:
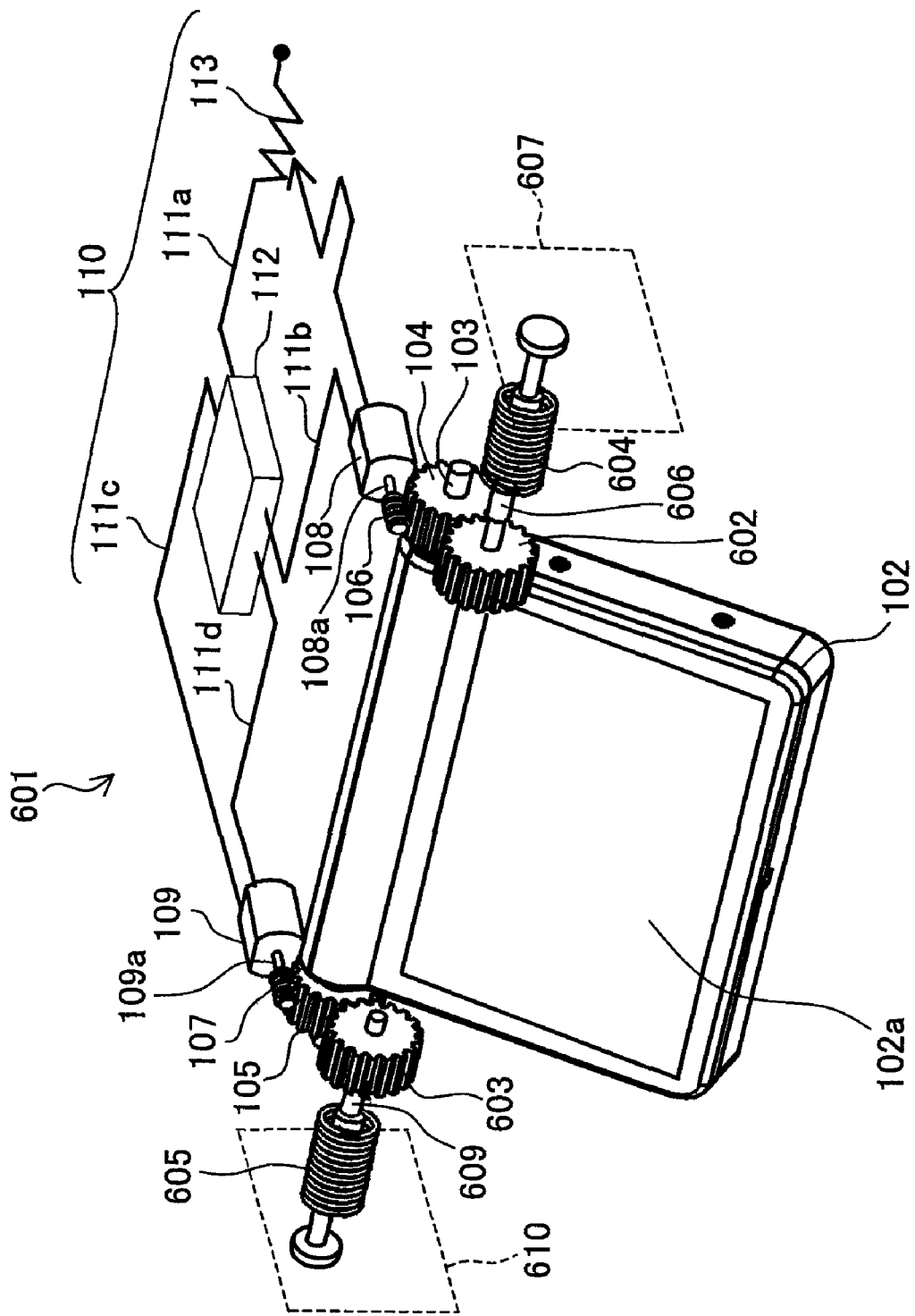
FIG. 7 is a perspective view showing schematic configurations of a power transmission device and a display device in Embodiment 2 of the present invention.

Next, a power transmission device in Embodiment 2 and a display device using the same of the present invention will be described with reference to FIGS. 7 and 8. FIG. 7 is a perspective view showing schematic configurations of the power transmission device and the display device in Embodiment 2 of the present invention. FIG. 8 shows a part of the power transmission device shown in FIG. 7 in an enlarged state, FIG. 8A is a view showing an attachment portion of a torsion coil spring 605, and FIG. 8B is a view showing an attachment portion of a torsion coil spring 604.

Furthermore, among the constituent elements shown in FIG. 7, the same constituent elements as those shown in the drawings used in Embodiment 1 are denoted with the same reference numerals as those in the drawings used in Embodiment 1. Furthermore, in the following description, the description of the same constituent elements as those shown in the drawings used in Embodiment 1 will be omitted.

In Embodiment 1, a backlash occurs when the display panel rotation angle θ at which the direction of the torque T1 is changed due to the weight is 90°. The vicinity in which the display panel rotation angle θ of 90° is a most preferred range for setting the position of the display panel during watching of a viewer. The torque change point at which a backlash is likely to occur preferably is present outside this range. In order to achieve this, the movement of a change point is performed in Embodiment 2 as described later.

Figure 8A:
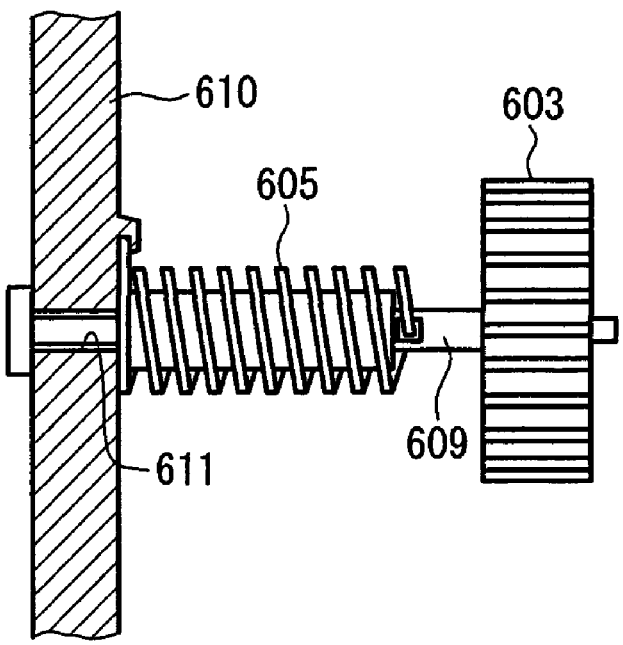
FIG. 8A is a view showing an attachment portion of a torsion coil spring 605.
Figure 8B:
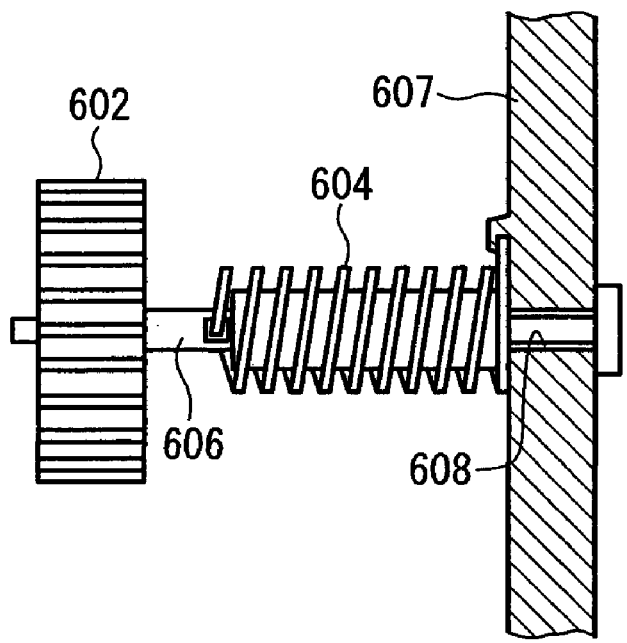
FIG. 8B is a view showing an attachment portion of a torsion coil spring 604.

As shown in FIGS. 7, 8A, and 8B, a power transmission device 601 in Embodiment 2 has the same configuration as that of the power transmission device 101 shown in FIG. 1 in Embodiment 1, and also has the following new configuration. The power transmission device in Embodiment 2 further includes a gear 602 to be engaged with the output gear 104, a gear 603 to be engaged with the output gear 105, and torsion coil springs 604 and 605. The gears 602 and 603, and the coil springs 604 and 605 constitute a resisting torque generating device that provides a resisting torque in an opposite direction of the driving torque to the output gears 104 and 105. The gears 602 and 603 function as resisting gears with respect to the output gears 104 and 105.

The gear 602 is provided with a support shaft 606 supporting the gear 602 along the center axis of the gear 602. The support shaft 606 is inserted in a through-hole 608 provided in a wall 607 so as to be rotatable. Similarly, the gear 603 also is provided with a support shaft 609 supporting the gear 603 along the center axis of the gear 603. The support shaft 609 also is inserted in a through-hole 611 provided in a wall 610 so as to be rotatable. The walls 607 and 610 are parts of an element attached to a ceiling surface in an automobile. In Embodiment 2, the walls 607 and 610 are not particularly limited, and for example, may be parts of a frame (not shown) of the display device or parts of a constituent member of an automobile.

Furthermore, as shown in FIG. 8A, the torsion coil spring 605 is placed with the support shaft 609 inserted therein, one end of the torsion coil spring 605 fixed to the support shaft 609, and the other end thereof fixed to the wall 610. Furthermore, as shown in FIG. 8B, the torsion coil spring 604 is placed with the support shaft 606 inserted therein, one end of the torsion coil spring 604 fixed to the support shaft 606, and the other end thereof fixed to the wall 607. The torsion coil springs 604 and 605 have the same spring characteristics.

Due to such a configuration, the driving forces from the motors 108 and 109 are transmitted to the gears 602 and 603 via the output gears 103 and 104, and when the gears 602 and 603 rotate, the torsion coil springs 604 and 605 receive a torsion moment (torque) to be deformed elastically. Furthermore, the elastic energy caused by the elastic deformation increases as the display panel 102 descends from the accommodated state and the display panel rotation angle θ increases.

Then, the torsion coil spring 604 generates a torque that resists the rotation of the gear 602. Similarly, the torsion coil spring 605 also generates a torque that resists the rotation of the gear 603 due to the elastic deformation caused by the torsion of the torsion coil spring 605. Furthermore, these torques increase in accordance with the increase in the display panel rotation angle θ.

Consequently, when the gear 602 transmits the driving force transmitted from the output gear 104 to the torsion coil spring 604, the gear 602 receives a braking that attempts to suppress the rotation of the gear 602 from the torsion coil spring 604. Similarly, when the gear 603 transmits the driving force transmitted from the output gear 105 to the torsion coil spring 605, the gear 603 receives a braking that attempts to suppress the rotation of the gear 603 from the torsion coil spring 605. That is, the torsion coil springs 604 and 605 generate torques that resist the rotations of the output gears 104 and 105, and transmit them to the output gears 104 and 105.

Figure 9A:
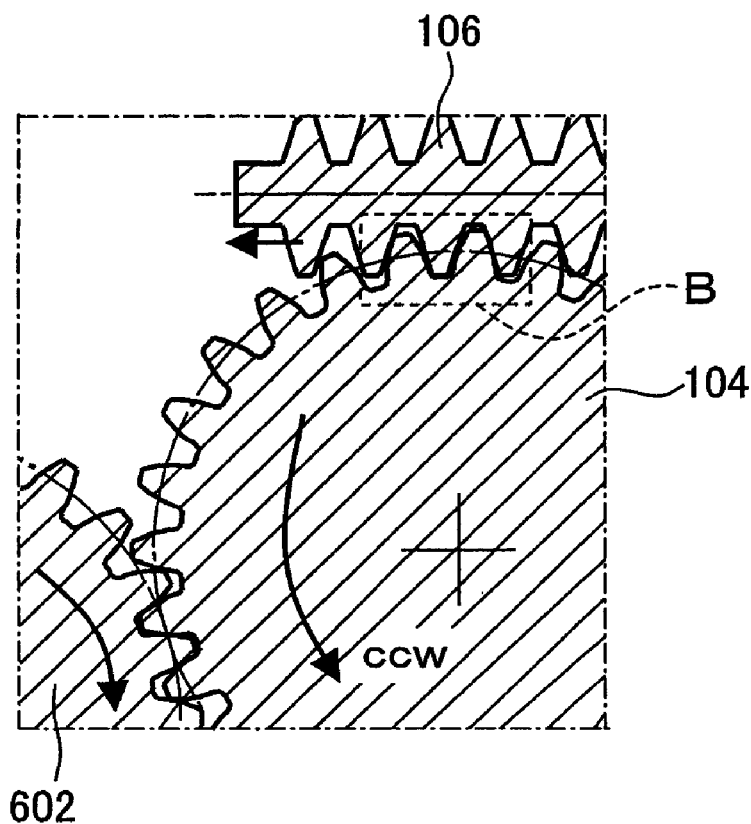
FIG. 9A is a cross-sectional view showing an engagement state among the transmission gear 106, the output gear 104, and the gear 602.
Figure 9B:
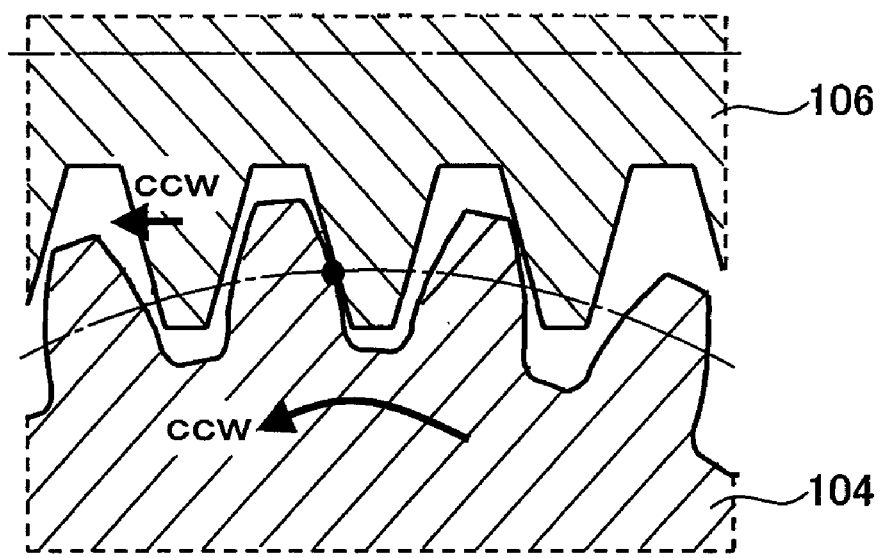
FIG. 9B is a cross-sectional view showing a portion B shown in FIG. 9A in an enlarged state.
Figure 10A:
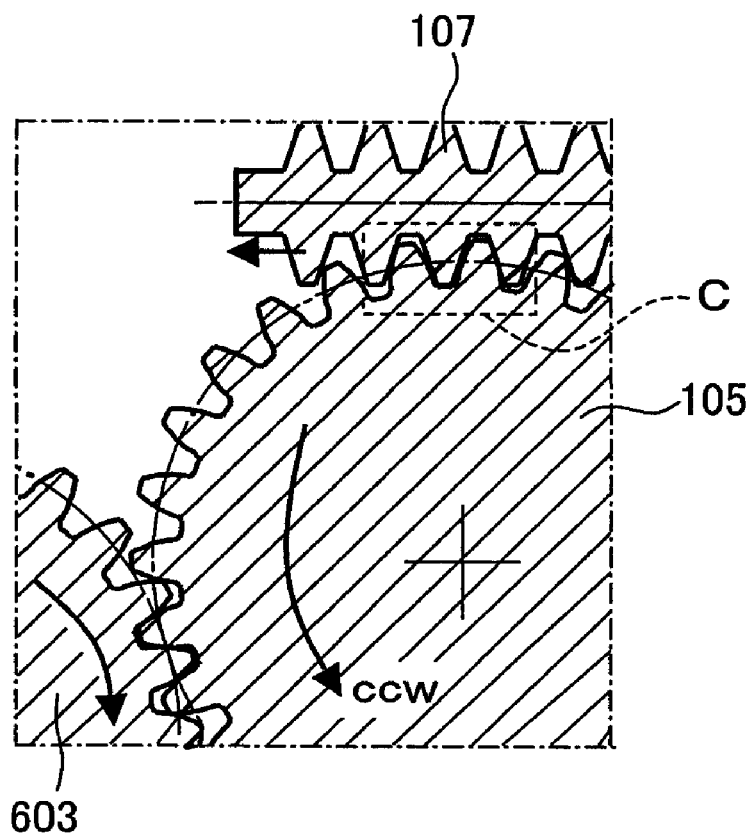
FIG. 10A is a cross-sectional view showing an engagement state among the transmission gear 107, the output gear 105, and the gear 603.
Figure 10B:
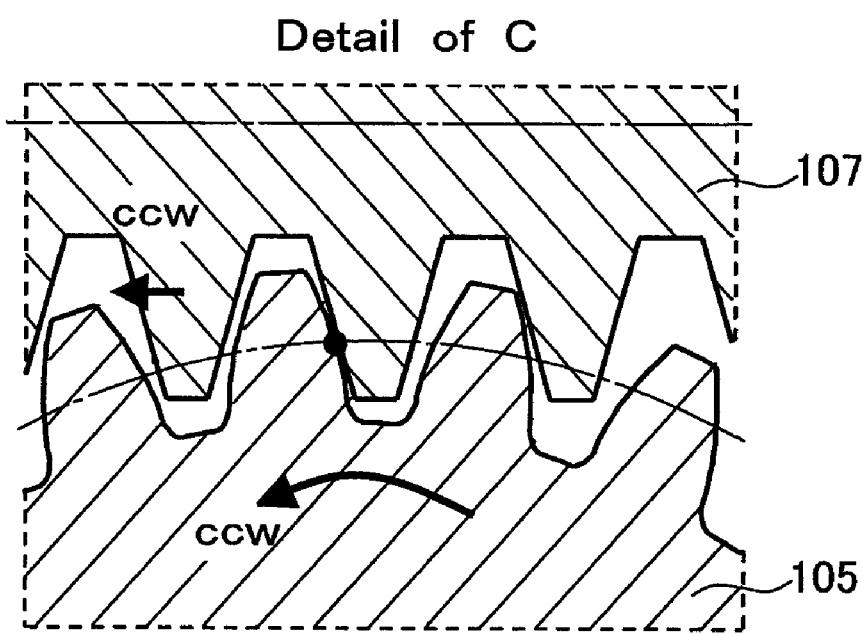
FIG. 10B is a cross-sectional view showing a portion C shown in FIG. 10A in an enlarged state.
Figure 11A:
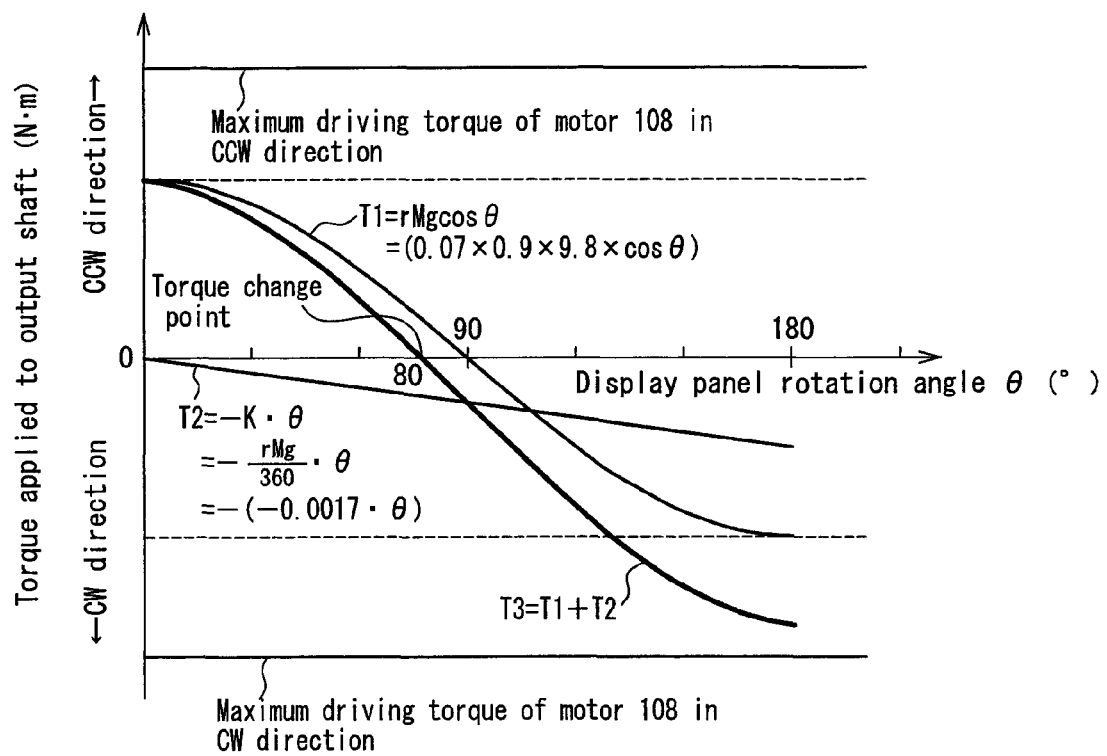
FIGS. 11A and 11B respectively show examples in which spring constants of torsion coil springs are different.
Figure 11B:
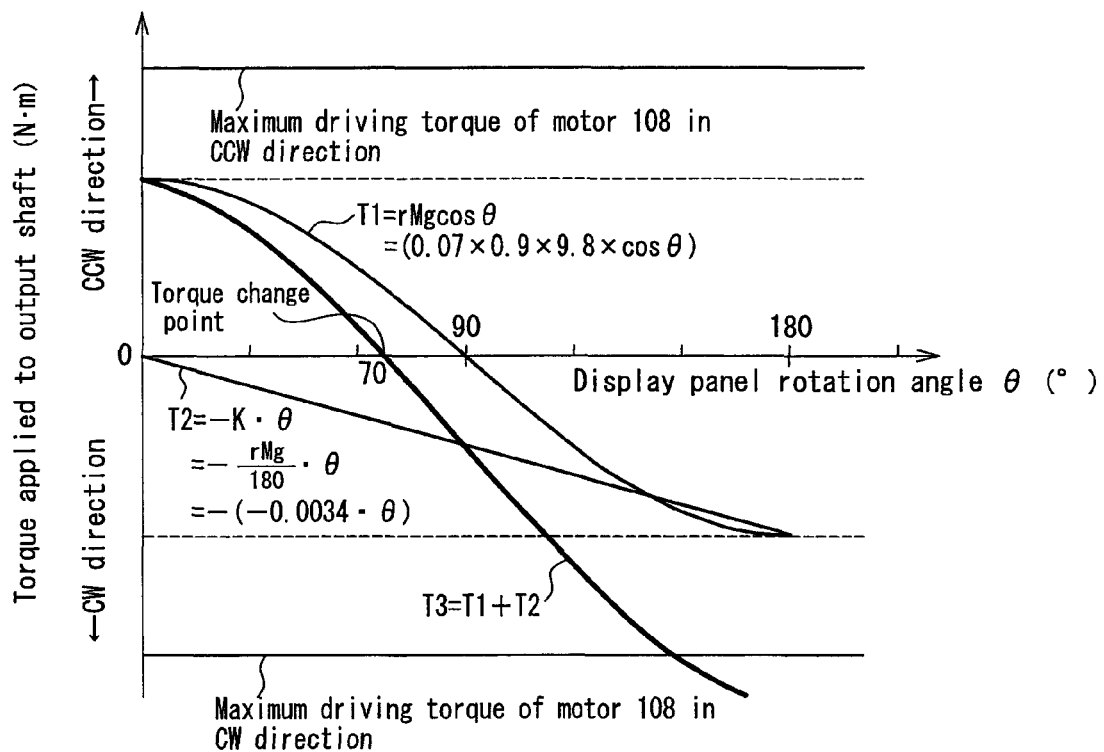

Next, the operation of the power transmission device 601 shown in FIGS. 7, 8A, and 8B will be described with reference to FIGS. 9-11. In the following description, FIGS. 7 and 8 will be referred to as appropriate. FIG. 9 shows an engagement state among respective gears on one side of the power transmission device shown in FIG. 7. FIG. 9A is a cross-sectional view showing an engagement state among the transmission gear 106, the output gear 104, and the gear 602, and FIG. 9B is a cross-sectional view showing a portion B shown in FIG. 9A in an enlarged state. FIG. 10 shows an engagement state among respective gears on the other side of the power transmission device shown in FIG. 7. FIG. 10A is a cross-sectional view showing an engagement state among the transmission gear 107, the output gear 105, and the gear 603, and FIG. 10B is a cross-sectional view showing a portion C shown in FIG. 10A in an enlarged state. Furthermore, FIG. 11 shows graphs of a relationship among a rotation angle of a display panel in Embodiment 2 of the present invention, a torque applied to an output shaft due to the weight of the display panel, and an elastic force of a torsion coil spring, and FIGS. 11A and 11B respectively show examples in which spring constants of torsion coil springs are different.

In Embodiment 2, the driving voltage of the motor 108 also is defined as 7.5 [V] and the driving voltage of the motor 109 also is defined as 8.0 [V], in the same way as in Embodiment 1. Furthermore, in Embodiment 2, the case where the display panel 102 is accommodated on a ceiling surface also is defined as 0°, and the angle at which the display panel 102 descends from the ceiling surface also is defined as a "display panel rotation angle θ". Furthermore, a "CW direction" is defined as a clockwise direction when the display panel 102 is seen from the right side of a viewer who watches the display panel 102, and a "CCW direction" is defined as a counterclockwise direction when the display panel 102 is seen from the right side of a viewer who watches the display panel 102.

When the viewer designates the rotation of the display panel 102 in the CCW direction (see FIG. 20A), the power supply unit 112 applies voltages to the motors 108 and 109, and moves tooth surfaces of the transmission gears 106 and 107 in the CCW direction as shown in FIG. 9A-FIG. 10B. Then, the output gear 104 engaged with the transmission gear 106 and the output gear 105 engaged with the transmission gear 107 are driven in the CCW direction, and the output shaft 103 rotating integrally with the output gears 104 and 105 also starts rotating in the CCW direction. Furthermore, at this time, a torque in the CCW direction due to the weight of the display panel 102 is applied to the output shaft 103 (FIG. 20).

Furthermore, in Embodiment 2, the gears 602 and 603 are driven by the output gears 104 and 105 rotating in the CCW direction, and rotate in the CW direction. At this time, as shown in FIGS. 9A and 10A, the respective tooth surfaces of the gears 602 and 602 on the rotation direction back side come into contact with tooth surfaces of the corresponding output gears 104 and 105 on the rotation direction front side.

Furthermore, at this time, the torsion coil springs 604 and 605 are deformed elastically, thereby generating a torsion moment (torque) T2 in the CCW direction. Then, the torques of the torsion coil springs 604 and 605 are transmitted respectively to the corresponding gears 602 and 603. Therefore, the gears 602 and 603 attempt to push back the pressure from the output gears 104 and 105. Thus, the output shaft 103 to which the output gears 104 and 105 are connected is supplied with the torque T2 in the CW direction caused by the torsion coil springs 604 and 605 via the gears 602 and 603, as well as the torque T1 due to the weight of the display panel.

Figure 20B:
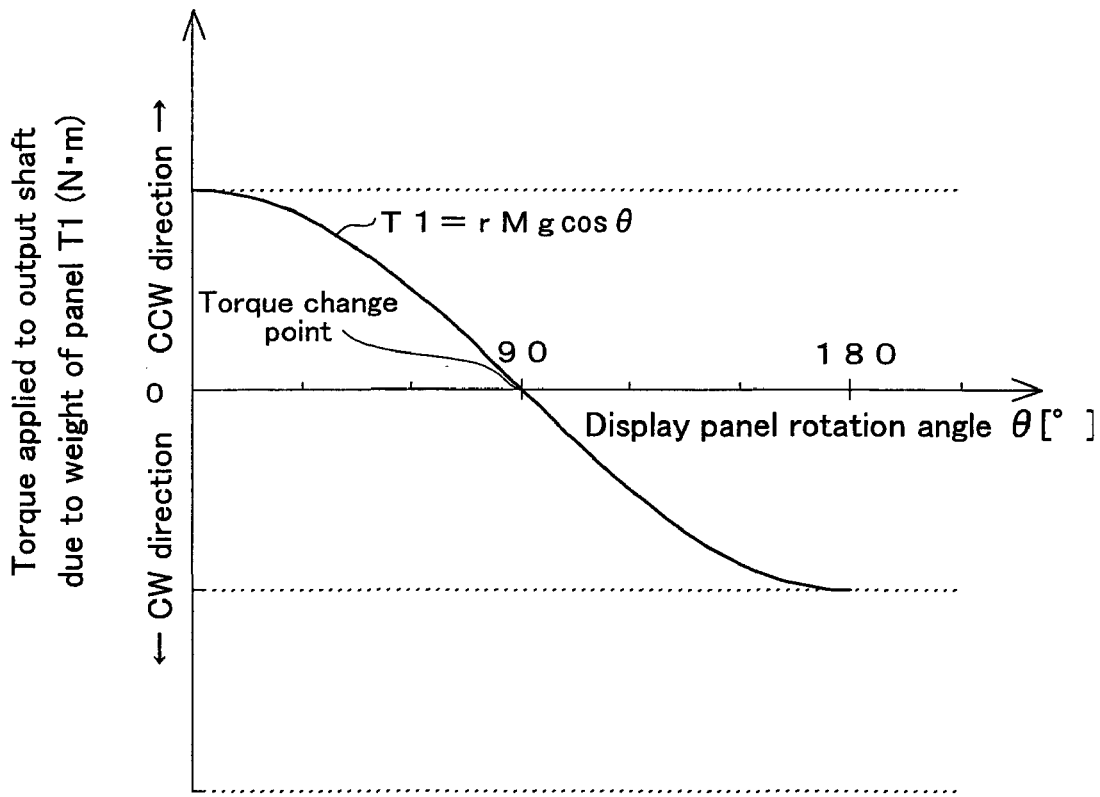
FIG. 20B shows a relationship between the rotation angle of the display panel and the torque applied to an output shaft due to the weight of the display panel.
Figure 21:
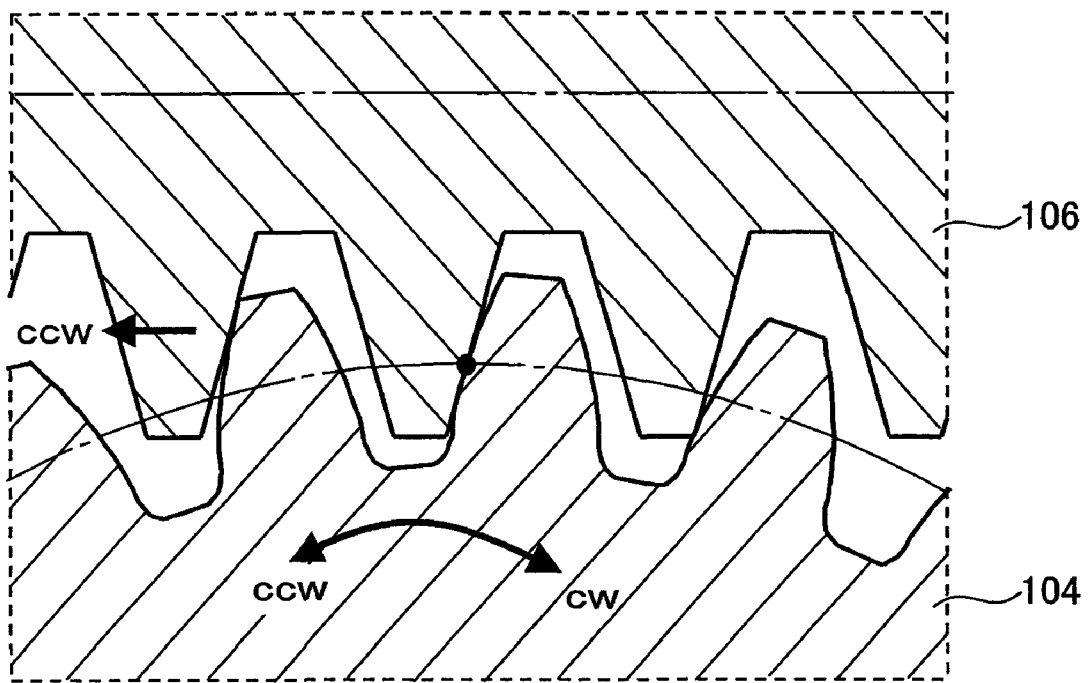
FIG. 21 is a cross-sectional view showing an engagement state between an output gear and a transmission gear in the case where the rotation angle of the display panel is less than 90°.
Figure 22:
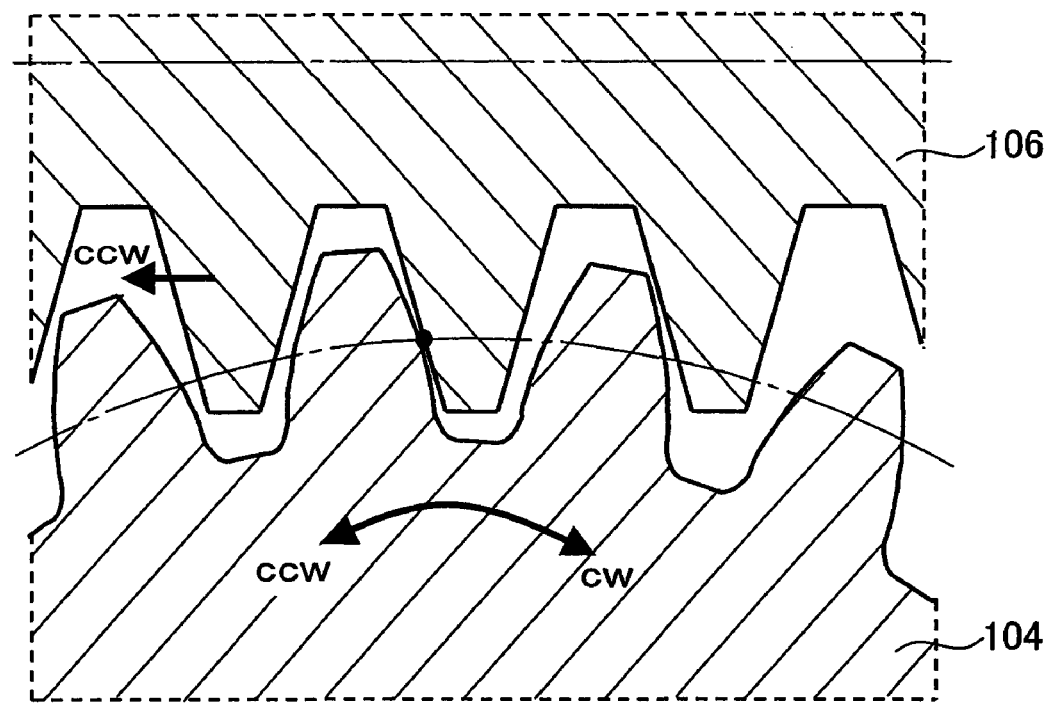
FIG. 22 is a cross-sectional view showing an engagement state between the output gear and the transmission gear in the case where the rotation angle of the display panel exceeds 900.

In Embodiment 1, in the same way as in the example shown in FIG. 20B in the Background Art, the torque applied to the output shaft 103 separately from the driving force is only the torque T1 due to the weight of the display panel 102. In Embodiment 1, the direction of the torque T1 is changed to an opposite direction when the display panel rotation angle θ is 90°. In Embodiment 1, the "torque change point" is obtained when θ=90°.

In contrast, in Embodiment 2, the torque T2 caused by the torsion coil springs 604 and 605 is added to the torque T1 due to the weight of the display panel 102. Furthermore, when a spring constant of the torsion coil spring 604 is defined as K1[N·m/°], a spring constant of the torsion coil spring is K2[N·m/°], and K1+K2=K[N·m/°], the torque T2 can be represented by the following Expression (2).

$$T2 = -K \cdot \theta \quad \text{(Expression 2)}$$

Thus, the display panel 102 is supplied with a combined torque T3 (=T1+T2) of the torques T1 and T2, separately from the driving forces caused by the motors 108 and 109. Thus, the relationship between the display panel rotation angle θ and the torques T1-T3 is as shown in FIGS. 11A and 11B. Furthermore, as shown in FIGS. 11A and 11B, since the value of the torque T2 increases along with the increase in θ, the direction of the combined torque T3 is changed when 0 is smaller than 90°. That is, in Embodiment 2, the torque change point moves to an angle smaller than 90°.

In FIG. 11A, the spring constant K is set to be (rMg/360). Furthermore, in FIG. 11B, the spring constant K is set to be (rMg/180). Furthermore, as described in the Background Art, M is a mass [Kg] of the display panel, g is a gravitational acceleration [m/s$^2$], and r is a distance [m] from the output shaft 103 to the gravity of the display panel 102.

Furthermore, as is understood from the comparison between FIG. 11A and FIG. 11B, the movement amount of the torque change point of the torque T3 is determined by the spring constant K[N·m/°] of the torsion coil spring 604. As the spring constant K increases, the torque T2 increases, so that the movement amount of the torque change point also becomes large. Thus, in order to place the torque change point away from the viewer's most preferred position range of the display panel, the value of the spring constant K may be increased.

When the spring constant K is too large, the resisting torques caused by the torsion coil springs 602 and 603 applied to the output gears 104 and 105 exceed the maximum driving torques from the motors 108 and 109 via the transmission gears 106 and 107. In this case, the problems that the display panel 102 cannot descend and the descent speed becomes low may arise.

Thus, in Embodiment 2, it is preferred to set the spring constant K so that the torque T2 at the display panel rotation angle θ=90° is a ¼ to ½ of the maximum value (=rMg) of the torque T1 at the display panel rotation angle θ=0° (or 180°). Specifically, the coil constant K may be set in a range of (rMg/360) to (rMg/180). Furthermore, in this case, the torque change point is present in a range of θ=70° to 80°.

Herein, the display panel 102 is defined as a 9-inch liquid crystal display panel in the same way as in Embodiment 1. Furthermore, the mass M of the display panel liquid crystal display panel) is defined as 0.9 [Kg], and the distance r from the output shaft 103 to the center of gravity of the display panel 102 is defined as 0.07 [m]. Then, the torque T1 applied to the output shaft 103 due to the weight of the display panel 102 becomes T1=0.07×0.9×9.8×cos θ, as shown in FIGS. 11A and 11B. At this time, the maximum value of the torque T1 is 0.617 [N·m].

Furthermore, in this case, in order to set the torque T2 at the display panel rotation angle θ=90° to be ¼ to ½ of the maximum value (=0.617 N·m) of the torque T1, the spring constant K of the torsion coil spring may be set in a range of 0.0017 to 0.0034 [N·m/°]. As described above, the torque change point is in a range of θ=70° to 80°.

Furthermore, the maximum display panel rotation angle θ that may be used for watching is defined as 135°, and the spring constants K of the torsion coil springs 604 and 605 are defined to be set in a range of 0.0017 to 0.0034 [N·m/°]. At this time, the maximum driving torque of the motor 108 may be set to be about 1.5 times (0.9 [N·m]) of the maximum value of the torque T1 due to the weight of the display panel 102. In this case, the combined torque T3 applied to the output shaft 103 will not exceed the maximum driving torque provided to the output shaft 103 by the motors 108 and 109.

Therefore, if the spring constants K of the torsion coil springs 604 and 605 are set in a range of (rMg/360) to (rMg/180) [N·m/°], the torque change point is in a range of 70° to 80°. Furthermore, at this time, the movable range of the display panel 102 is in a range of the display panel rotation angle θ=0° to θ=135°.

As described above, in Embodiment 2, the gear (resisting gear) to which the torsion coil spring is connected is engaged with the gear of the output shaft. Thus, the position of the torque change point at which a backlash may occur can be moved to the position where the display panel rotation angle θ becomes smaller than 90°. That is, by using a resisting torque generating device, the point at which a backlash occurs can be moved out of a range in which the viewer sets a stop position most frequently, i.e., a range in the vicinity of the display panel rotation angle θ=90°.

Furthermore, in Embodiment 2, a difference also is provided between the driving force of the motor 108 and the driving force of the motor 109 in the same way as in Embodiment 1. Thus, in Embodiment 2, a backlash occurring at a torque change point also can be removed by the same principle as that in Embodiment 1.

Furthermore, although FIG. 7 shows only the resisting torque generating device formed of torsion coil springs, in the present embodiment, an elastic body other than a torsion coil spring (e.g., a coil spring other than a torsion coil spring), or an elastic body such as a plate spring or a torsion bar also can be used. Furthermore, a material for forming the elastic body may be any material capable of being deformed elastically, and hence, a metal material, a resin material, or the like can be used without any limit.

Furthermore, in FIG. 7, although two torsion coil springs are set for each end of the output shaft, Embodiment 2 is not limited thereto. For example, an elastic body such as a torsion coil spring can be provided at one end.

Embodiment 3

Figure 12:
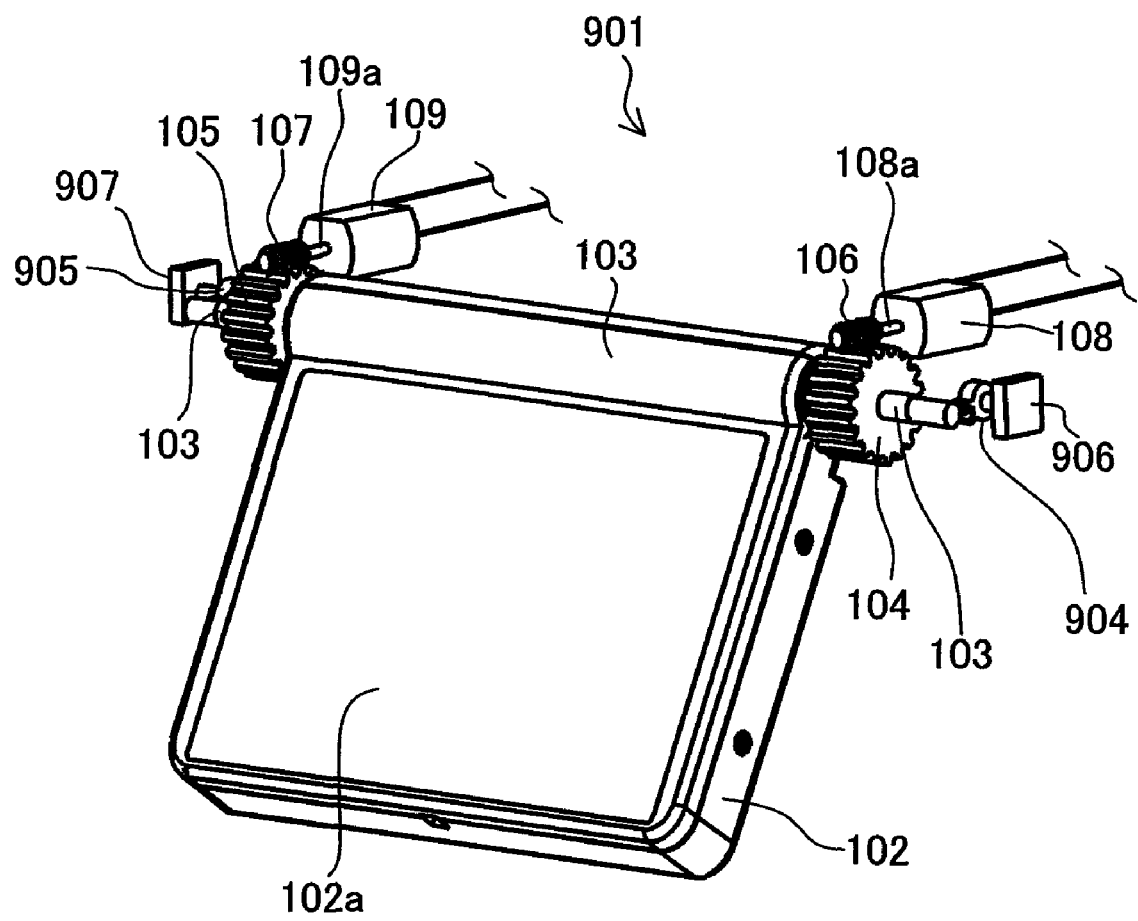
FIG. 12 is a perspective view showing schematic configurations of a power transmission device and a display device in Embodiment 3 of the present invention.
Figure 13A:
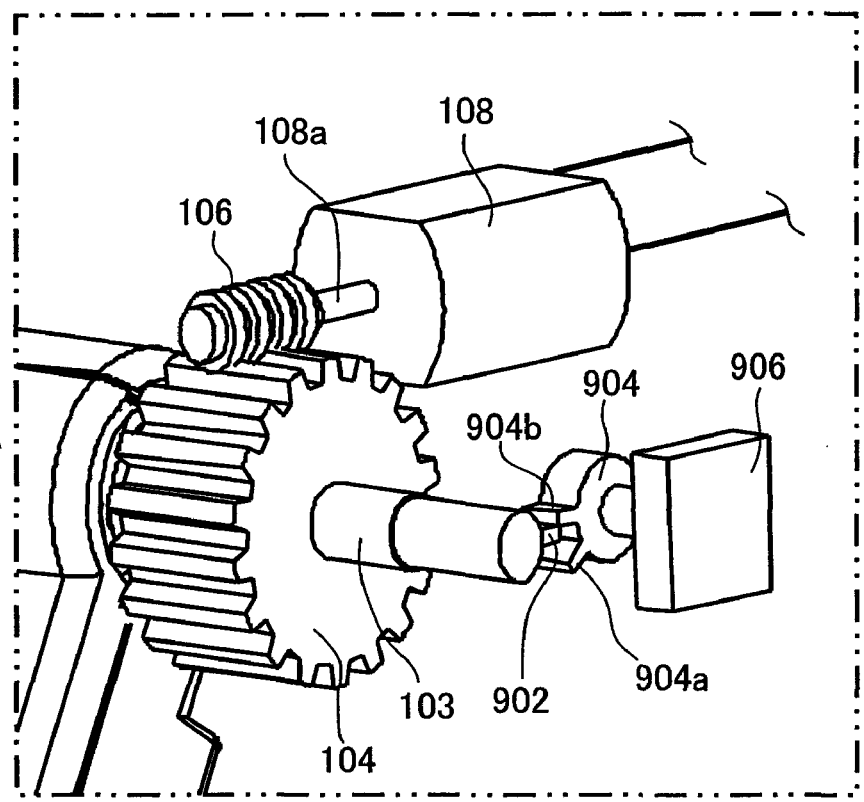
FIG. 13A shows the vicinity of a motor 108 and an output gear 104.
Figure 13B:
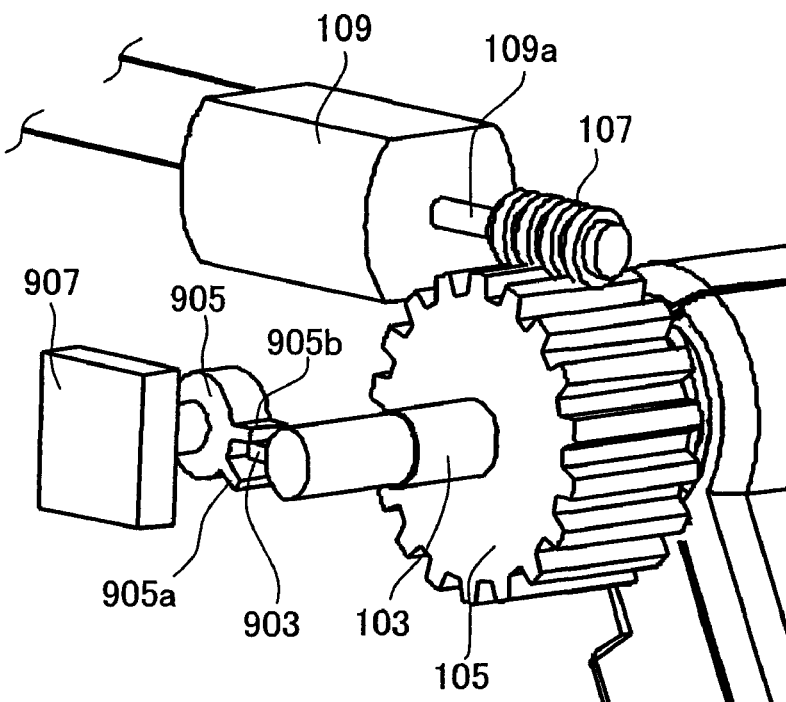
FIG. 13B shows the vicinity of a motor 109 and an output gear 105.

Next, the configurations of a power transmission device in Embodiment 3 and a display device using the same of the present invention will be described with reference to FIGS. 12 to 15. FIG. 12 is a perspective view showing schematic configurations of the power transmission device and the display device in Embodiment 3 of the present invention. FIG. 13 shows perspective views of a part of the power transmission device shown in FIG. 12 in an enlarged state, FIG. 13A shows the vicinity of a motor 108 and an output gear 104, and FIG. 13B shows the vicinity of a motor 109 and an output gear 105.

Figure 14:
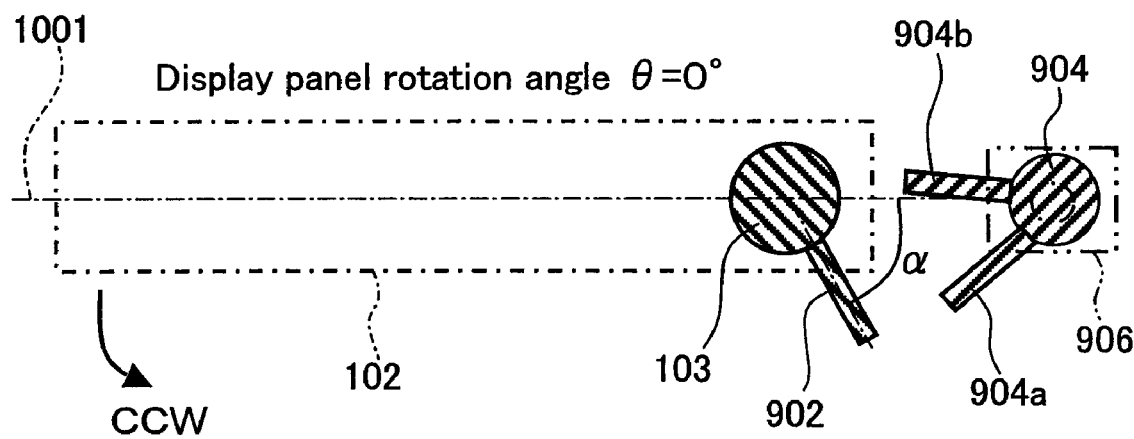
FIG. 14 is a diagram showing a positional relationship between a paddle provided at the output shaft shown in FIG. 12 and a paddle provided at a rotary switch.
Figures 15A, 15B:
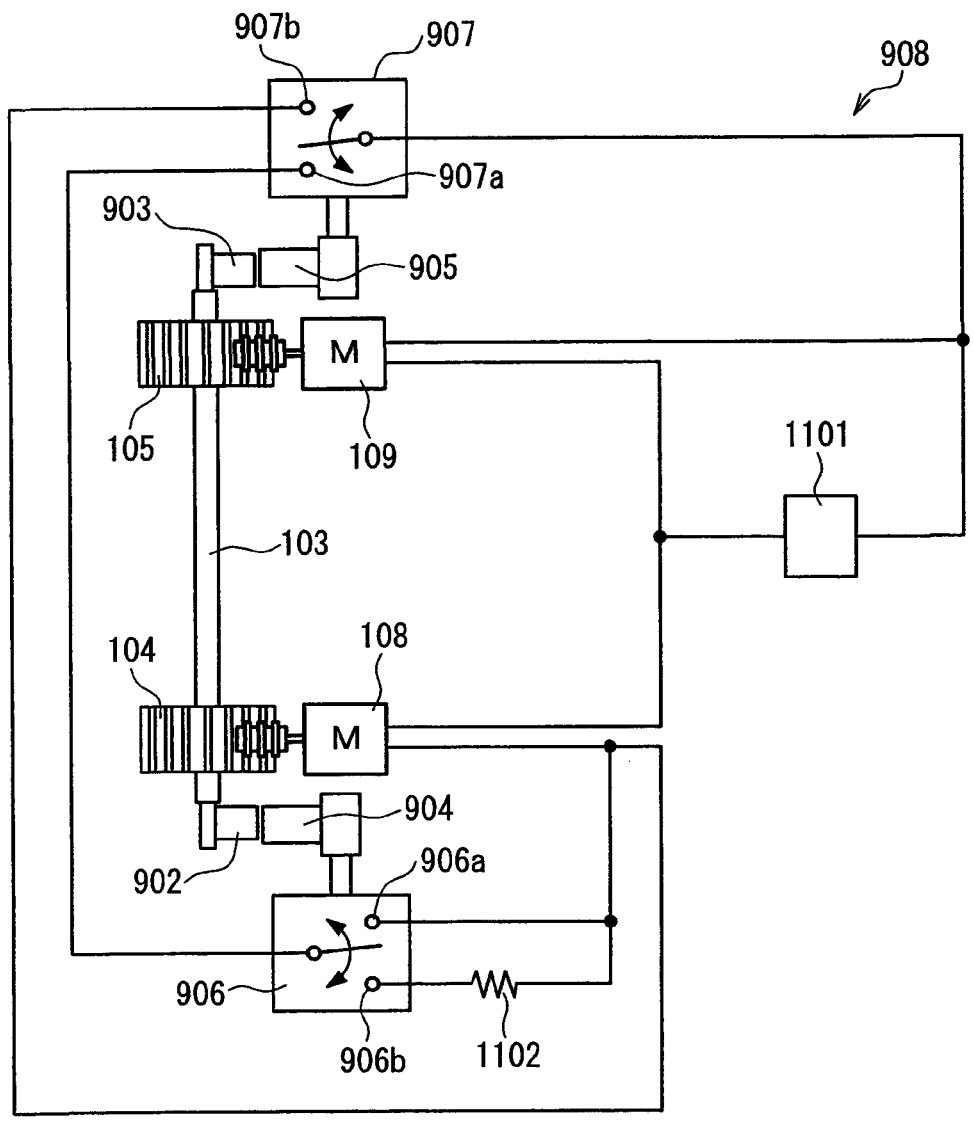
FIG. 15A is a circuit diagram showing a control circuit of the power transmission device shown in FIG. 12.
FIG. 15B shows a switching combination of the rotary switch shown in FIG. 15A.

FIG. 14 is a diagram showing a positional relationship between a paddle provided at the output shaft shown in FIG. 12 and a paddle provided at a rotary switch. FIG. 15A is a circuit diagram showing a control circuit of the power transmission device shown in FIG. 12, and FIG. 15B shows a switching combination of the rotary switch shown in FIG. 15A.

Furthermore, among the constituent elements shown in FIGS. 12-17, the same constituent elements as those shown in the drawings used in Embodiments 1 and 2 are denoted with the same reference numerals as those in the drawings used in Embodiments 1 and 2. Furthermore, in the following description, the description of the same constituent elements as those shown in the drawings used in Embodiments 1 and 2 is omitted.

In Embodiment 1, the motors 108 and 109 are driven with different voltages at all times. Thus, a difference is provided between the rotation number of the output gear 104 and the rotation number of the output gear 105 at all times even at points other than a torque change point of the torque T due to the weight of the display panel where a backlash occurs, which may become a burden on the motors 108 and 109. In Embodiment 3, the burden on the motors 108 and 109 is reduced.

As shown in FIGS. 12 to 14, a power transmission device 901 in Embodiment 3 has a configuration similar to that of the power transmission device 101 shown in FIG. 1 in Embodiment 1, and also has the following new configuration. The power transmission device 901 in Embodiment 3 newly has paddles 902 and 903 attached to the output shaft 103, and rotary switches 906 and 907. The paddles 902 and 903, and the rotary switches 906 and 907 constitute a rotation angle detection device detecting the rotation angle (=display panel rotation angle θ) of the output shaft.

Furthermore, as shown in FIG. 15, a control circuit 908 is different from the control circuit 110 shown in Embodiments 1 and 2. The control circuit 908 causes a difference between the driving force of the motor 108 and the driving force of the motor 109, when the display panel rotation angle θ detected by the rotation angle detection device reaches a set value or more (or exceeds the set value).

Specifically, as shown in FIG. 13A, the paddle 902 is provided at one end of the output shaft 103 so as to protrude in a direction perpendicular to the output shaft 103. Furthermore, as shown in FIG. 13B, the paddle 903 is provided at the other end of the output shaft 103 so as to protrude in a direction perpendicular to the output shaft 103 in the same way as in the paddle 902.

The rotary switches 906 and 907 are set on the wall (see FIGS. 7 and 8) at a position adjacent to the paddle 902 or 903. The rotary switches 906 and 907 are a part of the control circuit 908, as described later, and switch the wiring path in the control circuit 908. In Embodiment 3, the rotary switches 906 and 907 are both for three terminals and two circuits. The torque (switching operation torque) required for rotating the shaft of the rotary switch 906 is sufficiently small compared with the torque output by the motors 108 and 109.

Furthermore, as shown in FIGS. 13A and 14, the rotary switch 906 includes a contact portion 904 that comes into contact with the paddle 902 at a tip end of a shaft. The contact portion 904 includes a pair of protrusions 904a and 904b protruding in a V-shape in a direction perpendicular to the shaft of the rotary switch 906. Furthermore, the protrusions 904a and 904b are formed so as to be engaged with the paddle 902.

Thus, as shown in FIG. 14, when the output shaft 103 rotates, the paddle 902 comes into contact with the protrusion 904a or 904b to rotate the contact portion 904 and the shaft. Consequently, switching is performed in the rotary switch 906. Furthermore, in FIG. 14, "α" designates a set angle of the paddle 902 when the display panel 102 is in the accommodated state (state at the display panel rotation angle θ=0° shown in FIG. 20). The reference position of the set angle α is placed on a horizontal line 1001, and the CW direction with respect to the output shaft 103 is defined to be positive.

Thus, as shown in FIG. 14, in Embodiment 3, the setting of the paddle 902 and the contact portion 904, and the determination of the set angle α are performed so that the contact therebetween occurs at a position above the horizontal line 1001, when the display panel 102 starts rotating from the accommodated state (θ=0°).

Furthermore, as shown in FIG. 13B, the paddle 903 also is placed in the same way as in the paddle 902. Furthermore, as shown in FIG. 13B, a contact portion 905 constituted in the same way as in the contact portion 904 of the rotary switch 906 is provided at a tip end of the shaft of the rotary switch 907 (see FIGS. 15A and 17B). The contact portion 905 includes a pair of protrusions 905a and 905b in the same way as in the protrusions 904a and 904b, and rotates together with the shaft due to the contact with the paddle 903, thereby performing switching.

As shown in FIG. 15A, in Embodiment 3, the control circuit 908 includes the above-mentioned rotary switches 906 and 907 and a power supply unit 1101, and electric power is supplied from the power supply unit 1101 to the motors 108 and 109. Furthermore, the control circuit 908 has three circuit conditions I to III as shown in FIG. 15B, based on each switching combination of the rotary switches 906 and 907.

Furthermore, the power supply unit 1101 supplies a voltage of 8.0 [V]. A resistor 1102 drops the voltage of 8.0 [V] supplied from the power supply unit 1101 to 7.5 [V]. The resistor 1102 is provided on a wire connecting a terminal 906b of the rotary switch 906 to an input terminal of the motor 108.

According to the circuit condition I among three circuit conditions, a terminal 906a is connected in the rotary switch 906, and a terminal 907a is connected in the rotary switch 907. According to the circuit condition II, the terminal 906b is connected in the rotary switch 906, and the terminal 907a is connected in the rotary switch 907. Furthermore, according to the circuit condition III, the terminal 906b is connected in the rotary switch 906, and the terminal 907b is connected in the rotary switch 907.

Furthermore, according to the circuit condition I and the circuit condition III, a driving voltage of 8.0 [V] is applied to both the motors 108 and 109. On the other hand, according to the circuit condition II, a driving voltage of 8.0 [V] is applied to the motor 109, and a driving voltage of 7.5 [V] dropped by the resistor 1102 is applied to the motor 108. According to the circuit condition II, a difference is provided between the driving force of the motor 109 and the driving force of the motor 108. Thus, in Embodiment 3, the rotary switches 906 and 907 are switched therebetween, whereby the magnitude of the driving voltages applied to the motors 108 and 109 is converted.

Figure 16A:
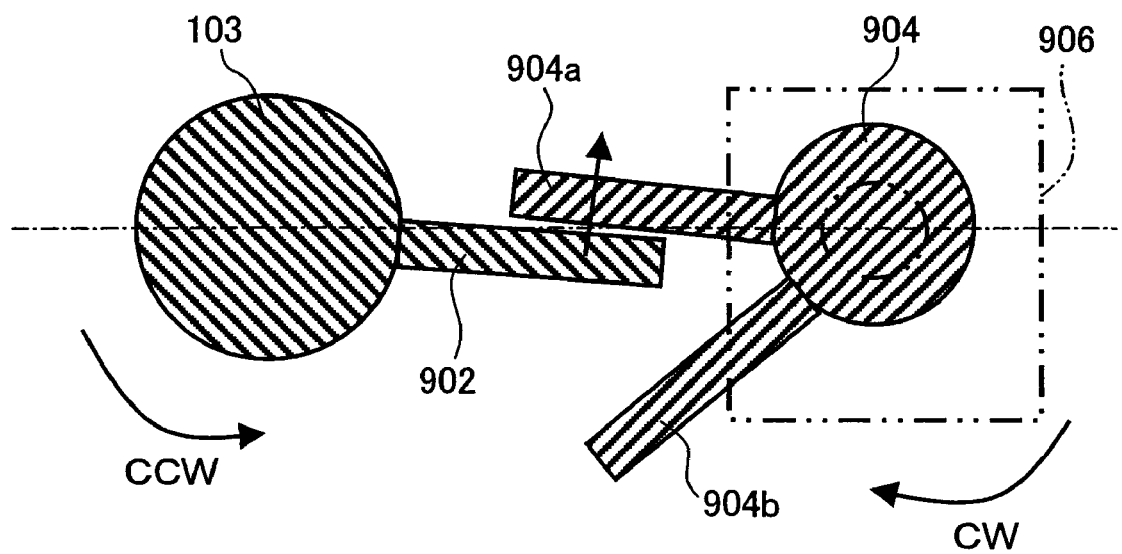
FIG. 16A shows the case where the paddle rotates in the CCW direction.
Figure 16B:
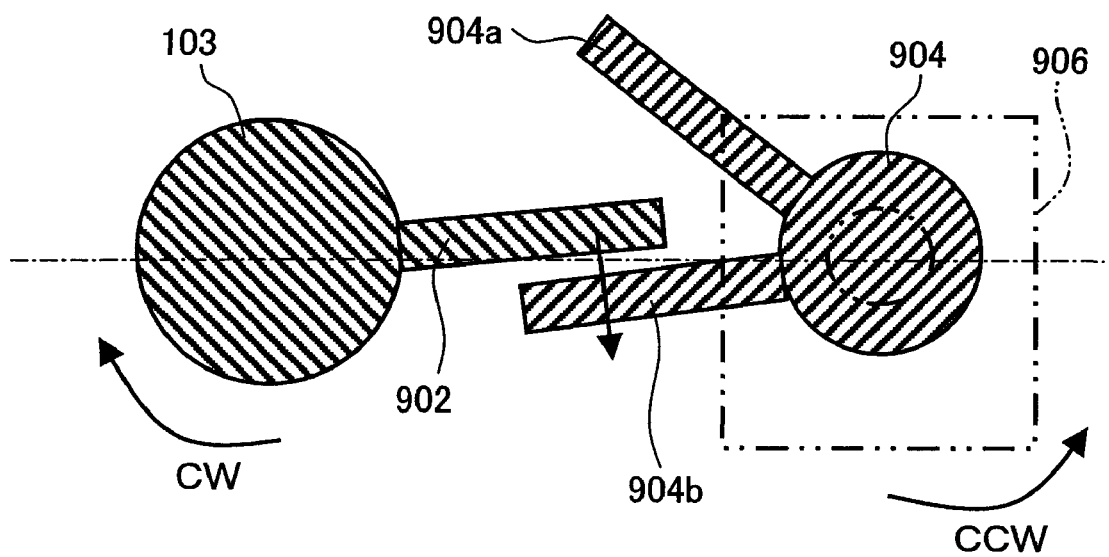
FIG. 16B shows the case where the paddle rotates in the CW direction.
Figure 17A:
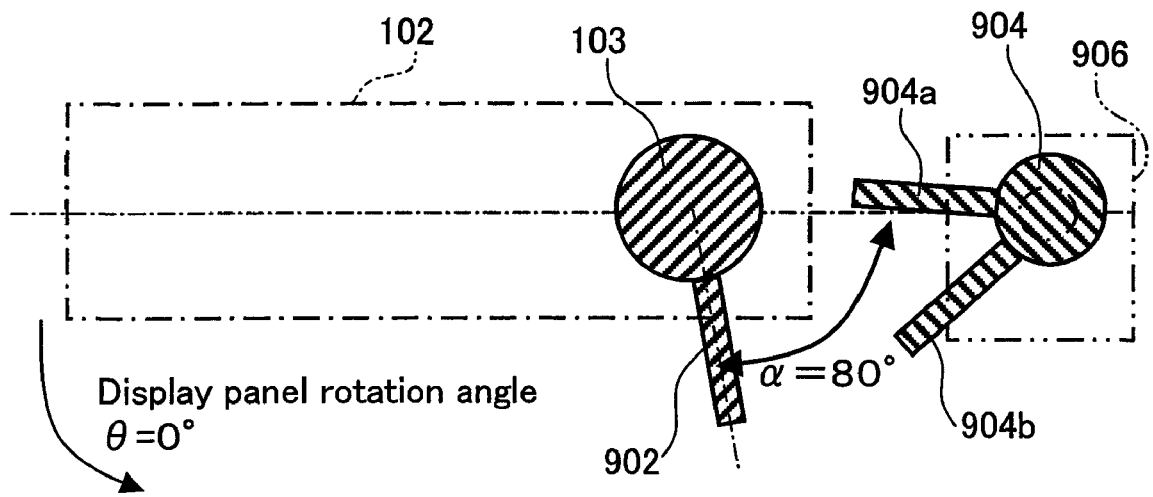
FIG. 17A shows an example in which the setting angle of the paddle 902 is set to be 80°.
Figure 17B:
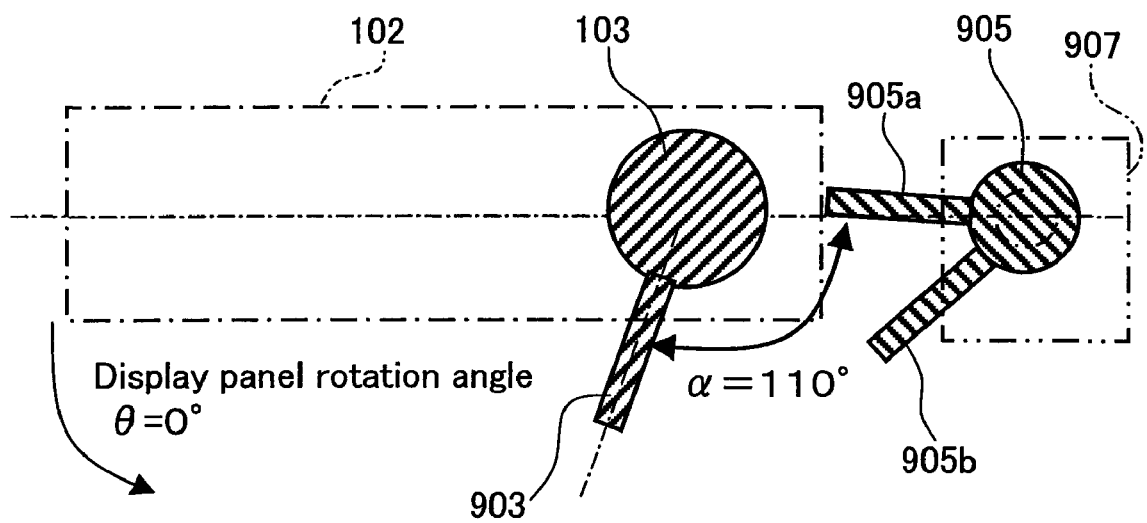
FIG. 17B shows an example in which the setting angle of the paddle 903 is set to be 110°.

The operations of the paddles 902 and 903, and the operations of the rotary switches 906 and 907 will be described with reference to FIGS. 16 and 17. FIG. 16 shows a switching operation of the rotary switch by the paddle shown in FIG. 12. FIG. 16A shows the case where the paddle rotates in the CCW direction, and FIG. 16B shows the case where the paddle rotates in the CW direction. FIG. 17 shows the determination of the setting angle α of the paddle shown in FIG. 12, FIG. 17A shows an example in which the setting angle of the paddle 902 is set to be 80°, and FIG. 17B shows an example in which the setting angle of the paddle 903 is set to be 110°.

As shown in FIG. 16A, when the output shaft 103 rotates in the CCW direction, the paddle 902 also rotates in the CCW direction accordingly. Then, the paddle 902 comes into contact with the protrusion 904a of the contact portion 904, and pushes up the protrusion 904a to rotate the contact portion 904 in the CW direction. Consequently, the shaft of the rotary switch 906 to which the contact portion 904 is attached rotates, whereby the switching of terminals is performed (see FIG. 15A).

On the other hand, as shown in FIG. 16B, when the output shaft 103 rotates in the CW direction, the paddle 902 also rotates in the CW direction accordingly. Then, the paddle 902 comes into contact with the protrusion 904b on the lower side of the contact portion 904, and pushes down the protrusion 904b to rotate the contact portion 904 in the CCW direction. Also in this case, the shaft of the rotary switch 906 rotates, whereby the switching of terminals is performed; however, in this case, the terminal is switched to a different terminal from that in the case of FIG. 16A. The operations of the paddle 905 and the rotary switch 907 also are performed similarly.

In Embodiment 3, by determining the respective setting angles α of the paddles 902 and 902 set at the output shaft 103, the positions at which the respective rotary switches 906 and 907 are switched can be adjusted. This will be described with reference to FIGS. 17A and 17B. The display panel rotation angle θ of the display panel 102 is 0° in FIGS. 17A and 17B.

As shown in FIG. 17A, the setting angle α of the paddle 902 is set to be 80°. As shown in FIG. 17B, the setting angle α of the paddle 903 is set to be 110°. Furthermore, in the examples in FIGS. 17A and 17B, in the case where the display panel rotation angle is 0°, the terminal 906a is selected in the rotary switch 906, and the terminal 907a is selected in the rotary switch 907.

Thus, when the display panel 102 starts descending from the accommodated state, and the display panel rotation angle θ reaches 80°, the paddle 902 pushes up the protrusion 904a of the contact portion 904, whereby the terminal of the rotary switch 906 is switched from 906a to 906b. Then, when the display panel rotation angle θ reaches 110°, the paddle 903 pushes up the protrusion 905a of the contact portion 905, whereby the terminal of the rotary switch 907 is switched from 907a to 907b.

Thus, in the examples shown in FIGS. 17A and 17B, the switching of the rotary switch 906 and the switching of the rotary switch 907 occur at separate positions. Consequently, the circuit conditions I, II, and III are selected successively, and the display panel rotation angle θ is in a range of 80° to 110°, a difference is provided between the driving force of the motor 108 and the driving force of the motor 109 in the same way as in Embodiment 1.

Figure 18:
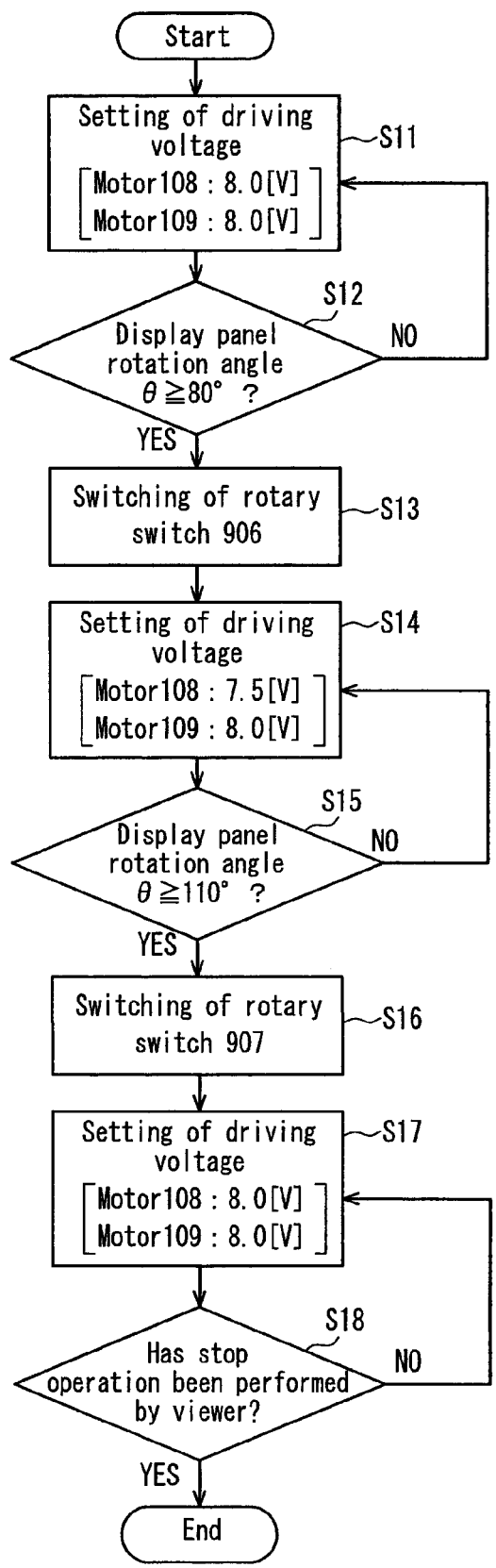
FIG. 18 is a flowchart showing the processing performed by the power transmission device in Embodiment 3 of the present invention.

Next, the processing performed in the power transmission device 901 shown in FIGS. 12 to 17 will be described with reference to FIG. 18. FIG. 18 is a flowchart showing the processing performed in the power transmission device in Embodiment 3.

As shown in FIG. 18, first, when a viewer (passenger) designates the descent of the display panel 102 by an operation input, the power supply unit 1101 supplies electric power to the motors 108 and 109 with a set driving voltage of 8.0 [V]. Immediately before the supply of electric power to the power supply unit 1101, the display panel 102 is in the accommodated state, and the circuit condition (I) is selected.

Next, it is determined whether or not the display panel rotation angle θ reaches 80° or more by the rotary switch 906 (Step S12). When the display panel rotation angle θ is less than 80°, the paddle 902 does not push up the protrusion 904a (see FIG. 17A), so that the state when Step S11 is performed is continued.

On the other hand, when the display panel rotation angle θ reaches 80° or more, the paddle 902 pushes up the protrusion 904a (see FIG. 17A), the terminal of the rotary switch 906 is switched from 906a to 906b, whereby a value of the driving voltage supplied to the motor 108 is set again (Step S14).

Specifically, since the circuit condition (II) is selected, the voltage applied to the motor 108 is dropped by the resistor 1102 to reach 7.5 [V]. The driving voltage applied to the motor 109 remains 8.0 [V]. As a result of Step S14, in Embodiment 3, a difference is provided between the driving force of the motor 108 and the driving force of the motor 109 in the same way as in the case of Embodiment 1. Thus, when the display panel rotation angle θ reaches the vicinity of 90°, a backlash is removed by the same principle as that in Embodiment 1.

Next, it is determined whether or not the display panel rotation angle θ reaches 110° or more by the rotary switch 907 (Step S15). When the display panel rotation angle θ is less than 110°, the paddle 903 does not push up the protrusion 905a (see FIG. 17B), so that the state when Step S14 is performed is continued.

On the other hand, when the display panel rotation angle θ reaches 110° or more, the paddle 903 pushes up the protrusion 905a (see FIG. 17B), and the terminal of the rotary switch 907 is switched from 907a to 907b, whereby the value of a driving voltage supplied to the motor 108 is set again (Step S17).

Specifically, since the circuit condition (III) is selected, the voltage applied to the motor 108 is increased to 8.0 [V]. The driving voltage applied to the motor 109 remains to be 8.0 [V].

After that, the power supply unit 1101 determines whether or not an operation (stop operation) of stopping the rotation of the display panel 102 has been performed by the viewer (Step S18). While the stop operation has not been performed, the power supply unit 1101 continues supplying a driving voltage, and the state when Step S17 is performed is continued.

On the other hand, in the case where the stop operation has been performed, the power supply unit 1101 stops the supply of a driving voltage, and the display panel stops while the current display panel rotation angle θ is maintained. The processing similar to that in Step S18 also can be performed between Steps S11 and S12, and between Steps S14 and S15.

As described above, in Embodiment 3, only in the case where the display panel 102 is positioned in a range where play is likely to occur due to a backlash, a difference is provided between the driving force of the motor 108 and the driving force of the motor 109. Otherwise, the output shaft 103 is driven with the driving force of the motor 108 being the same as that of the motor 109. Thus, according to Embodiment 3, the loads applied to the motors 108 and 109 can be reduced, compared with those in Embodiments 1 and 2. Furthermore, in Embodiment 3, the range of the display panel rotation angle θ at which a difference in driving force is provided between motors can be adjusted by setting the setting angle α between the paddles 902 and 903 appropriately (see FIGS. 14 and 17). Thus, Embodiment 3 can address even the case where the change point in a torque direction moves as shown in Embodiment 2.

Furthermore, in Embodiment 3, although the rotation angle (display panel rotation angle θ) of the output shaft is detected, using the rotation angle detection device formed of a paddle and a rotary switch, the present invention is not limited thereto. In Embodiment 3, a rotation angle detection device detecting the rotation angle of an output shaft using another means such as an angle sensor also can be used.

Furthermore, in the examples shown in FIGS. 12 to 18, although the power transmission device 901 in Embodiment 3 is configured in such a manner that the rotation angle detection device and the like are added to the power transmission device 101 in Embodiment 1, Embodiment 3 is not limited to this example. The power transmission device 901 in Embodiment 3 may be configured in such a manner that the rotation angle detection device and the like are added to the power transmission device 601 in Embodiment 2.

The power transmission devices shown in Embodiments 1-3 can be used as a display panel pedestal. In the display panel pedestal, although the output shaft 103 and the display panel 102 are not connected to each other, the output shaft 103 is provided with holding tools such as a holder and a socket for connecting the display panel 102 along the longitudinal axis. By attaching the display panel to the output shaft of the display panel pedestal, the display device of the present invention is obtained.

Furthermore, in Embodiments 1-3, although a liquid crystal display panel is used as the display panel 102, the present invention is not limited thereto, and the kind and size of the display panel 102 are not particularly limited. As the display panel 102, a flat display panel such as a plasma display (PD) panel, an electroluminescence (EL) display panel, or a field emission display (FED) panel also can be used instead of the liquid crystal display panel. Furthermore, in Embodiments 1-3, although the power transmission device and the display device are attached to an automobile, they also can be attached to a house, an office, or the like. Furthermore, the power transmission device of the present invention also can use an object other than a display panel as a rotation object.

INDUSTRIAL APPLICABILITY

In the power transmission device of the present invention, in the case where an object such as a display panel is attached to an output shaft and rotated, a backlash occurring at a point where a weight torque of the object is inverted can be removed. Furthermore, play occurring at an output axis due to a backlash can be prevented. Thus, the power transmission device of the present invention is useful for various devices requiring power transmission, and hence has industrial applicability. Furthermore, a display device and a display panel pedestal that use the power transmission device also have industrial applicability.

The invention claimed is:

1. A display device comprising a display panel, an output shaft connected to the display panel, two electric motors providing driving forces to the output shaft, and a control circuit controlling the two electric motors,
   wherein the display panel is connected to the output shaft to rotate together with the output shaft,
   the control circuit controls the two electric motors so that the two electric motors provide the driving forces in the same direction to the output shaft and a difference is present between the respective driving forces of the two electric motors,
   the output shaft is connected to the display panel along one side of a display screen of the display panel so that both ends of the output shaft protrude from the display panel, and includes output gears connected to the respective ends, and
   the respective two electric motors have transmission gears that correspond to the output gears different from each other and that are engaged with the corresponding output gears, and further drive the corresponding output gears via the transmission gears,
   said display device further comprising a resisting gear that is provided for each of the output gears and that is engaged therewith, and a resisting torque generating device that generates a resisting torque resisting a rotation torque that rotates the resisting gear.

2. The display device according to claim 1, wherein the resisting torque generating device includes an elastic body for each of the resisting gears, and the elastic body is deformed elastically due to a rotation of the corresponding resisting gear, and an elastic force generated due to the elastic deformation generates the resisting torque.

3. A display device comprising a display panel, an output shaft connected to the display panel, two electric motors providing driving forces to the output shaft, and a control circuit controlling the two electric motors,
   wherein the display panel is connected to the output shaft to rotate together with the output shaft, and
   the control circuit controls the two electric motors so that the two electric motors provide the driving forces in the same direction to the output shaft and a difference is present between the respective driving forces of the two electric motors,
   said display device further comprising a rotation angle detecting device detecting a rotation angle of the output shaft from a reference position, wherein the control circuit controls the two electric motors so that a difference is present between the driving forces of the two electric motors, when the rotation angle detected by the rotation angle detecting device reaches a set value or more or the rotation angle detected by the rotation angle detecting device exceeds the set value.

4. The display device according to claim 3, wherein in a case where the output shaft is placed so as to receive a torque caused by a weight of the display panel, and there is a position where a direction of the torque becomes opposite when the output shaft is rotated from the reference position,
   the set value is set to be a value smaller than the rotation angle when a position of the output shaft is matched with the position where the direction of the torque becomes opposite.

5. A power transmission device comprising an output shaft, two electric motors providing driving forces to the output shaft, and a control circuit controlling the two electric motors,
   wherein the control circuit controls the two electric motors so that the two electric motors provide the driving forces in the same direction to the output shaft, and a difference is present between the respective driving forces of the two electric motors,
   the output shaft includes two output gears connected to the output shaft, and
   the respective two electric motors have transmission gears that correspond to output gears different from each other and that are engaged with the corresponding output gears, and further drive the corresponding output gears via the transmission gears,
   said power transmission device further comprising a resisting gear that is provided for each of the output gears and that is engaged therewith, and a resisting torque generating device that generates a resisting torque resisting a rotation torque that rotates the resisting gear.

6. The power transmission device according to claim 5, wherein the resisting torque generating device includes an elastic body for each of the resisting gears, and the elastic body is deformed elastically due to a rotation of the corresponding resisting gear, and an elastic force generated due to the elastic deformation generates the resisting torque.

7. A power transmission device comprising an output shaft, two electric motors providing driving forces to the output shaft, and a control circuit controlling the two electric motors,
   wherein the control circuit controls the two electric motors so that the two electric motors provide the driving forces in the same direction to the output shaft, and a difference is present between the respective driving forces of the two electric motors,
   said power transmission device further comprising a rotation angle detecting device detecting a rotation angle of the output shaft, wherein the control circuit controls the two electric motors so that a difference is present between the driving forces of the two electric motors, when the rotation angle detected by the rotation angle detecting device reaches a set value or more or the rotation angle detected by the rotation angle detecting device exceeds the set value.

8. A display device comprising a display panel, an output shaft connected to the display panel, two electric motors providing driving forces to the output shaft, and a control circuit controlling the two electric motors,
   wherein the display panel is connected to the output shaft to rotate together with the output shaft,
   the output shaft is placed so as to receive a torque caused by a weight of the display panel, and there is a position where a direction of the torque becomes opposite when the output shaft is rotated from a first position, and
   the control circuit controls the two electric motors so that the two electric motors provide the driving forces in the same direction to the output shaft and a difference is present between the respective driving forces of the two electric motors.

9. The display device according to claim 8, wherein the output shaft is connected to the display panel along one side of a display screen of the display panel so that both ends of the output shaft protrude from the display panel, and includes output gears connected to the respective ends,
   wherein the respective two electric motors have transmission gears that correspond to the output gears different from each other and that are engaged with the corresponding output gears, and further drive the corresponding output gears via the transmission gears.

10. A power transmission device comprising an output shaft, two electric motors providing driving forces to the output shaft, and a control circuit controlling the two electric motors,
    wherein the output shaft is placed so as to receive a torque caused by a weight of a rotation object attached to the output shaft, and there is a position where a direction of the torque becomes opposite when the output shaft is rotated from a first position, and
    the control circuit controls the two electric motors so that the two electric motors provide the driving forces in the same direction to the output shaft, and a difference is present between the respective driving forces of the two electric motors.

11. The power transmission device according to claim 10, wherein the output shaft includes two output gears connected to the output shaft, and
    the respective two electric motors have transmission gears that correspond to output gears different from each other and that are engaged with the corresponding output gears, and further drive the corresponding output gears via the transmission gears.

12. A display panel pedestal comprising the power transmission device according to claim 10.

* * * * *